US011713136B2

(12) United States Patent
Foggia et al.

(10) Patent No.: US 11,713,136 B2
(45) Date of Patent: Aug. 1, 2023

(54) UNMANNED AERIAL VEHICLE POSITIONING MECHANISM

(71) Applicant: Flirtey Holdings, Inc., Reno, NV (US)

(72) Inventors: John R Foggia, Reno, NV (US); Jess Hayden, Reno, NV (US); Joseph Rinaldi, Reno, NV (US); Matthew Sweeny, Reno, NV (US)

(73) Assignee: Flirtey Holdings, Inc., Reno, NV (US)

( * ) Notice: Subject to any disclaimer, the term of this patent is extended or adjusted under 35 U.S.C. 154(b) by 431 days.

(21) Appl. No.: 16/817,415

(22) Filed: Mar. 12, 2020

(65) Prior Publication Data

US 2020/0207484 A1    Jul. 2, 2020

Related U.S. Application Data

(63) Continuation of application No. PCT/US2018/050926, filed on Sep. 13, 2018.

(60) Provisional application No. 62/558,192, filed on Sep. 13, 2017.

(30) Foreign Application Priority Data

Jul. 31, 2018    (GB) .................................. 1812471

(51) Int. Cl.
| | |
|---|---|
| *B64F 1/22* | (2006.01) |
| *B64C 39/02* | (2023.01) |
| *B64F 1/36* | (2017.01) |
| *B60P 3/11* | (2006.01) |
| *B64U 10/13* | (2023.01) |
| *B64U 80/86* | (2023.01) |

(52) U.S. Cl.
CPC .............. *B64F 1/22* (2013.01); *B64C 39/024* (2013.01); *B64F 1/222* (2013.01); *B64F 1/36* (2013.01); *B60P 3/11* (2013.01); *B64U 10/13* (2023.01); *B64U 80/86* (2023.01)

(58) Field of Classification Search
CPC .... B64F 1/22; B64F 1/222; B64F 1/02; B64C 2201/18; B64C 2201/182
See application file for complete search history.

(56) References Cited

U.S. PATENT DOCUMENTS

| | | | |
|---|---|---|---|
| 4,123,020 A | 10/1978 | Korsak | |
| 9,387,940 B2 * | 7/2016 | Godzdanker | .............. B64F 1/12 |
| 10,369,975 B2 * | 8/2019 | Wang | .................... B64C 39/024 |

(Continued)

FOREIGN PATENT DOCUMENTS

| | | |
|---|---|---|
| CA | 1188286 A | 6/1985 |
| CN | 204250382 U | 4/2015 |

(Continued)

OTHER PUBLICATIONS

International Search Report and Written Opinion dated Jan. 31, 2019 for PCT Application No. PCT/US2018/050926.

*Primary Examiner* — Joshua J Michener
*Assistant Examiner* — Arfan Y. Sinaki
(74) *Attorney, Agent, or Firm* — EIP US LLP

(57) ABSTRACT

Disclosed are unmanned aerial vehicle (UAV) positioning mechanisms for moving a UAV across a surface. The positioning mechanisms comprise a first guide assembly arranged opposite to a second guide assembly. A drive system is arranged to move the first guide assembly towards the second guide assembly and guide the UAV from a first position to a second position.

13 Claims, 15 Drawing Sheets

(56) References Cited

U.S. PATENT DOCUMENTS

| | | | |
|---|---|---|---|
| 10,414,517 B2 * | 9/2019 | Wang | B64F 1/02 |
| 10,507,938 B2 * | 12/2019 | Raz | G05D 3/10 |
| 11,352,148 B2 * | 6/2022 | Svirsky | B64F 1/12 |
| 2007/0228214 A1 | 10/2007 | Horak | |
| 2014/0124621 A1 * | 5/2014 | Godzdanker | B64F 1/12 |
| | | | 244/110 E |
| 2014/0319272 A1 * | 10/2014 | Casado Magana | B60L 50/52 |
| | | | 244/110 E |
| 2015/0175276 A1 | 6/2015 | Koster | |
| 2016/0159496 A1 | 6/2016 | O'Toole | |
| 2016/0311329 A1 | 10/2016 | Rodriguez | |
| 2017/0129464 A1 * | 5/2017 | Wang | B64C 39/024 |
| 2017/0158353 A1 | 6/2017 | Schmick | |
| 2017/0174343 A1 | 6/2017 | Erickson et al. | |
| 2017/0225799 A1 | 8/2017 | Selwyn et al. | |
| 2017/0225802 A1 | 8/2017 | Lussier et al. | |
| 2017/0240062 A1 * | 8/2017 | Jaiswal | G01S 13/913 |
| 2017/0253349 A1 * | 9/2017 | Wang | B64F 1/02 |
| 2017/0334581 A1 | 11/2017 | White et al. | |
| 2018/0009549 A1 | 1/2018 | Sullivan et al. | |
| 2019/0023416 A1 * | 1/2019 | Borko | B64F 1/222 |

FOREIGN PATENT DOCUMENTS

| | | |
|---|---|---|
| CN | 104734294 A | 6/2015 |
| CN | 106904288 A | 6/2017 |
| CN | 107284686 A | 10/2017 |
| CN | 206842288 U | 1/2018 |
| EP | 2799336 A1 | 11/2014 |
| EP | 2899128 A1 | 7/2015 |
| EP | 3124380 A1 | 2/2017 |
| WO | 2016053746 A1 | 4/2016 |
| WO | 2017029611 A1 | 2/2017 |
| WO | 2018039784 A1 | 3/2018 |

* cited by examiner

UNMANNED AERIAL VEHICLE POSITIONING MECHANISM

CROSS-REFERENCE TO RELATED APPLICATIONS

This application is a continuation of International Application No. PCT/US2018/050926, filed Sep. 13, 2018, which claims the benefit of U.S. Provisional Application No. 62/558,192, filed Sep. 13, 2017, and claims priority to GB Application No. GB 1812471.9, filed Jul. 31, 2018, under 35 U.S.C. § 119(a). Each of the above-referenced patent applications is incorporated by reference in its entirety.

BACKGROUND OF THE INVENTION

Field of the Invention

The present disclosure relates to an unmanned aerial vehicle positioning mechanism.

Description of the Related Technology

Unmanned aerial vehicles (UAVs), such as drones, are autonomous and/or remotely operated aerial vehicles. UAVs may be configured to fly using fixed wings or rotors and blades. A UAV may be operated by a human operator who manually controls the UAV during flight. Some UAVs can fly fully or partially autonomously, for example an onboard or remote computing system can control the UAV during take-off, flight towards a destination, and landing. These autonomous UAVs may be controlled by utilizing Global Positioning Systems (GPS) or any such similar navigation systems.

With both manually and autonomously operated UAV systems it is often difficult to accurately land the UAV in a desired location. For example, human inaccuracy, human error, weather conditions and navigation system inaccuracies may each make it difficult to precisely position the UAV during landing. Accurate landing may be required in situations where the UAV is used to collect or drop-off a package, undergo maintenance, or undergo a battery swap procedure, for example.

Some existing UAV positioning mechanisms use a moveable arm which sweeps across a landing surface to move the UAV towards one edge of a rectangular landing surface. However, such mechanisms are limited as to how precisely the UAV can be positioned. Other existing UAV positioning mechanisms have two inclined surfaces set apart by a distance equal the width of the UAV landing gear, and the inclined surfaces guide the UAV towards a position on the landing surface. However, such a mechanism requires a certain degree of accuracy when landing to ensure the UAV is aligned with the inclined surfaces. Furthermore, this mechanism requires prior knowledge of the size of the UAV so that the inclined surfaces can be correctly spaced. Other existing UAV positioning mechanisms are fully-passive in nature and have a conically shaped landing surface, so that the UAV slides towards the lowest point on the landing surface after landing. While this passive positioning mechanism is simple in design, the conically shaped landing surface can make interacting with the UAV impractical once positioned.

Accordingly, there is a need for an improved UAV positioning mechanism which overcomes problems with existing UAV positioning mechanisms.

SUMMARY

According to a first aspect of the present disclosure, there is provided an unmanned aerial vehicle (UAV) positioning mechanism for moving a UAV from a first position to a third position via a second position, comprising: a first guide assembly comprising a first part having a first retaining member connected thereto and a second part having a second retaining member connected thereto. The UAV positioning mechanism further comprises a second guide assembly spaced apart from the first guide assembly, wherein the first and second guide assemblies define therebetween an area for receiving a UAV. The UAV positioning mechanism further comprises a drive system for moving the first guide assembly in a first direction and a second direction. The drive system is arranged to move the first guide assembly in the first direction towards the second guide assembly, such that the first part and the second part guide the UAV from a first position to a second position. The drive system is further arranged to move the first guide assembly in the second direction to move the UAV from the second position to a third position. The first and second retaining members are arranged to engage the UAV when the UAV is positioned at the second position such that the UAV moves with the first guide assembly in the second direction to the third position. The second guide assembly may be spaced apart from the first guide assembly along a first axis, and the drive system may be arranged to move the first guide assembly along the first axis in the first and second directions.

The UAV positioning mechanism according to this first embodiment therefore positions the UAV in two steps. For example, a UAV initially lands in a first unknown position which can be anywhere in the area between the first and second guide assemblies. From here, the first guide assembly moves towards the second guide assembly to abut and push/guide the UAV towards the second guide assembly. Here the UAV is in a known, second position. For example, the UAV may abut both the first and second guide assemblies. In this second position, the retaining members can accurately engage with the UAV because it is located in a known position. The retaining members engage the UAV so that the UAV can be carried with the first guide assembly as it moves in the second direction. The first guide assembly thus moves the UAV into a third known position. Moving from the second position to the third position can mean that the UAV is moved away from the second guide assembly, moved away from the edges of the area (also known as a landing area), or be moved onto a moveable platform.

In one arrangement, as the first guide assembly moves in the second direction, it moves away from the second guide assembly. Therefore, in some configurations, the second guide assembly is static in that it does not move in the first direction or the second direction. This means that the overall complexity of the positioning mechanism can be reduced. In another arrangement however, the second guide assembly also moves in the second direction. This can aid movement of the UAV towards the third position, which may be helpful if the UAV is particularly heavy.

The first part and second parts may be separate components in some examples. In other examples, the first and second parts are unitary.

In an example, the first guide assembly comprises a movable support. The first part may have a first end and a second end, and the first end of the first part is mounted on the movable support. Similarly, the second part may have a first end and a second end, and the first end of the second part is mounted on the movable support. The drive system is arranged to move the second ends of the first and second parts towards the second guide assembly and move the moveable support towards the second guide assembly.

Such a construction means that the first and second parts are moveable with respect to each other and with respect to the moveable support to more precisely guide the UAV from the first position to the second position. For example, as the second ends of the first and second parts move towards the second guide assembly an angle subtended between the first and second parts may decrease. This can help "funnel" or guide the UAV along the length of the first and/or second part towards a certain location along the length of the moveable support, therefore assisting to position the UAV into the second position.

In one particular arrangement, the first ends of the first and second parts are pivotably mounted on the moveable support, and the drive system comprises a first actuator arranged to pivot the second end of the first part towards the second guide assembly and a second actuator arranged to pivot the second end of the second part towards the second guide assembly.

The movement is therefore a rotation caused by actuators which allows the second ends of the first and second parts to rotate towards each other. For example, the first and second parts may rotate from a first arrangement in which they are substantially parallel to the moveable support to a second arrangement in which an angle is subtended between the first part and the moveable support and the second part and the movable support. In the second arrangement the first and second parts may form a "V" or "U" shape extending outwards from the moveable support, which guides the UAV towards the moveable support.

The retaining members may engage the UAV in a variety of ways. For example, the retaining members may be engaged by components on the UAV. In other examples, the drive system is arranged to cause the retaining members to move such that they positively engage the UAV. In a specific example, the retaining members are electromagnets and are activated by the drive system to attract/engage magnetic material on or surrounding the UAV. In other examples, the retaining members interlock with corresponding components on the UAV or they grip one or more surfaces of the UAV.

Preferably, the first retaining member is pivotably mounted on the first part, and the second retaining member is pivotably mounted on the second part, and the drive system is arranged to pivot the first and second retaining members between a first configuration and a second configuration. In the first configuration, the first and second retaining members are arranged substantially parallel to the first and second parts, respectively. In the second configuration the first and second retaining members engage the UAV. In the second configuration, the first and second retaining members may therefore define an angle between the first and second parts, respectively. For example, the first and second retaining members may each rotate away from the first and second parts by 90 degrees to engage and grip an outer surface of the UAV. In the first configuration the first and second retaining members may be parallel and therefore flush with the first and second parts, so that the UAV can be easily guided along the length of the first and second parts.

The pivoting/rotational movement of the first and second retaining members may be controlled by one or more actuators. For example, the drive system may comprise a third actuator arranged to pivot the first retaining member between the first configuration and the second configuration and a fourth actuator arranged to pivot the second retaining member between the first configuration and the second configuration.

In some arrangements the first guide assembly comprises first and second portions connected to the first and second parts, respectively, via one or more hinges. In these arrangements, the first part is connected to a first portion by a hinge, and the second part is connected to a second portion via another hinge. The first and second portions are arranged to hinge (i.e. pivot about the hinge) as the second ends of the first and second parts move towards the second guide assembly. For example, as the second ends of the first and second parts move/pivot towards the second guide assembly, the first and second portions pivot about their respective hinges.

By having two or more sections hinged together in this way, the area occupied by the positioning mechanism when not in use can be reduced because these sections can be "folded" when the positioning mechanism is not being used.

Preferably, the first guide assembly further comprises a first guide rail and a second guide rail arranged substantially parallel to, and spaced apart from, the first guide rail. An end of the first portion is slidably mounted on the first guide rail, such that the first portion moves along the first guide rail as the drive system moves the first guide assembly in the first and second directions. Similarly, an end of the second portion is slidably mounted on the second guide rail, such that the second portion moves along the second guide rail as the drive system moves the first guide assembly in the first and second directions. When the first guide assembly does not have the first and second portions, the second ends of the first and second parts may instead by slidably mounted on the guide rails.

It will be appreciated from the foregoing that the guide rails effectively define the width of the area within which the UAV is positioned and constrain/control movement of the first guide assembly across the area.

In certain arrangements the second guide assembly is substantially similar to the first guide assembly, and may therefore comprise any or all of the components described above in relation to the first guide assembly.

For example, the second guide assembly may comprise a second support, a third part and a fourth part, and the third and fourth parts are arranged to guide the UAV towards the second position. The third part has a first end and a second end, and the first end of the third part is mounted on the second support. The fourth part has a first end and a second end, and the first end of the fourth part is mounted on the second support. The drive system is arranged to move the second ends of the third and fourth parts towards the first guide assembly. As for the first and second parts, the movement of the third and fourth parts help align and guide the UAV towards the second position. In one arrangement, the second support is a static support, and does not move in the first or second direction. In other arrangements, the second support is a moveable support and can move in the first and second directions.

Preferably, the first ends of the third and fourth parts are pivotably mounted on the second support, and the drive system comprises a third actuator arranged to pivot the second end of the third part towards the first guide assembly and a fourth actuator arranged to pivot the second end of the fourth part towards the first guide assembly.

In one embodiment, the first and second guide assemblies are vertically offset from each other so that the first/second guide assembly can move above/below the other guide assembly. This arrangement allows more efficient use of space when positioning the UAV within the landing area because each of the first and second guide assemblies can move closer together without having to accommodate the physical space taken up by the other guide assembly when moving across the landing area.

For example, in some arrangements, the second guide assembly is spaced apart from the first guide assembly along a first axis and the area extends along at least the first axis and a second axis, the second axis being perpendicular to the first axis. The first guide assembly is spaced apart from the second guide assembly along a third axis, the third axis being perpendicular to both the first axis and the second axis. When the drive system moves the first guide assembly in the first direction towards the second guide assembly, the first part is spaced apart from the third part along the third axis and the second part is spaced apart from the fourth part along the third axis when the UAV is located at the second position. For example, the landing area may be substantially horizontally orientated, so that the third axis is substantially vertical. Therefore, "spaced apart along the third axis" means that the components are vertically offset. This arrangement means that components of the first and second guide assemblies cross-over each other as the move towards each other.

In one example, the second guide assembly further comprises third and fourth portions connected to the third and fourth parts respectively via one or more hinges, wherein the third and fourth portions are arranged to hinge as the second ends of the third and fourth parts move towards the first guide assembly. Again, these hinged components allow the positioning mechanism to be effective in a smaller area.

In some examples, the positioning mechanism is arranged upon, affixable to, or comprises a surface for receiving the UAV. The surface may also be known as a landing surface. The surface extends between the first and second guide assemblies and therefore at least partially defines the area upon which the UAV may land and/or be positioned. The landing surface, or a portion of the surface, may be moveable and form an elevator platform to move the UAV below the positioning mechanism and/or, when the elevator platform comprises a portion of the surface, below the remainder of the landing surface. For example, the UAV may be lowered within a container upon which the positioning mechanism is located. The UAV may be stored within the container, may collect/deposit a payload, and/or may undergo a battery charging/swap procedure. The moveable platform may be lowered once the UAV has been positioned on the platform and raised before the UAV takes flight again.

Accordingly, the UAV positioning mechanism may further comprise a moveable platform capable of forming at least part of a surface for receiving the UAV, wherein the first and second positions are positions on the surface, and the third position is a position on the platform. The drive system is arranged to lower the platform along an axis arranged perpendicular to a plane defined by the platform, thereby to lower the UAV with respect to the surface. The axis may be the third, vertical axis, for example.

In certain arrangements, the platform delimits an aperture through which to receive or deposit a payload. A payload may be a battery, or a package, for example. The aperture may be arranged below the UAV when the UAV is positioned on the moveable platform, and thus may be sized to allow a payload to pass through. The aperture may therefore be large enough to receive/deposit a payload, but be small enough to ensure that the UAV does not fall through the aperture.

Preferably, the aperture is closable, and may be embodied as at least one member in the moveable platform, in which case the drive system may be arranged to move the at least one member between a closed configuration and an open configuration. In the closed configuration, the at least one member is positioned to close the aperture to form part of the surface and in the open configuration, the at least one member is positioned so as not to obstruct the aperture. In effect the member closes the aperture when not in use. This can be advantageous to protect the area below the positioning mechanism, such as the interior of the container, from bad weather, and also stops animals and humans from gaining access.

In one example, the drive system is arranged to move the first and second guide assemblies away from each other before lowering the platform. This avoids the rotor blades of the UAV colliding with the guide assemblies as the UAV is moved downwards.

The above described a first embodiment of a positioning mechanism in which the UAV is moved in a two-step process and where only once guide assembly is required to move along an axis. A second embodiment will now be described in which a one-step movement occurs where both of the first and second guide assemblies move towards each other.

In this embodiment the positioning mechanism can be referred to as a UAV transport mechanism, which comprises a moveable platform capable of forming at least part of the landing surface, a first guide assembly and a second guide assembly. The first and second guide assemblies are arranged on opposite sides of the moveable platform. The UAV transport mechanism further comprises a drive system arranged to move the first and second guide assemblies towards each other, thereby to guide the UAV from a first, landing, position to a second, lowering, position, the second position being a position on the platform. The drive system is further arranged to lower the platform to lower the UAV with respect to the landing surface.

The UAV transport mechanism according to this second embodiment therefore positions the UAV along the landing surface in a single step. For example, a UAV initially lands in a first unknown position (also known as the landing position) which can be anywhere in the area between the first and second guide assemblies. From here, the first and second guide assemblies move towards each other to abut and push/guide the UAV towards a moveable platform. Here the UAV is in a known, second position (also known as the lowering position). For example, the UAV may abut both the first and second guide assemblies. When located in this second position, the moveable platform can be lowered (i.e. moved along a vertical axis) to move the UAV below the landing surface. The UAV may be moved into a container arranged below the landing surface.

The UAV transport mechanism may comprise any or all of the features and components described in relation to the first embodiment. Similarly, any of the features described in relation to the second embodiment may also be incorporated into the first embodiment.

For example, the platform may delimit an aperture through which to receive or deposit a payload, and the aperture may be closable.

In certain arrangements, the drive system is arranged to move the first and second guide assemblies away from each other before lowering the platform. For example, the first guide assembly may move in the second direction, away from the movable platform, and the second guide assembly may move in the first direction, away from the moveable platform.

In some examples the landing surface comprises a fixed surface part, and the platform has a flat upper surface, which is positionable to be generally coplanar with respect to the fixed surface part. As a result the platform forms part of the landing surface. For example, the platform may be arranged generally centrally within the landing surface so that the fixed surface part surrounds the platform. The fixed surface part may be stationary, which is to say that it is not moveable along a vertical axis.

In one arrangement, the first guide assembly comprises a first moveable support, and a first part having a first end and a second end, the first end of the first part being mounted on the first moveable support. The first guide assembly further comprises a second part having a first end and a second end, the first end of the second part being mounted on the first moveable support. The second guide assembly comprises a second moveable support and a third part having a first end and a second end, the first end of the third part being mounted on the second moveable support. The second guide assembly further comprises a fourth part having a first end and a second end, the first end of the fourth part being mounted on the second moveable support. The drive system is further arranged to move the second ends of the first and second parts towards the second guide assembly and move the second ends of the third and fourth parts towards the first guide assembly.

Preferably the first ends of the first and second parts are pivotably mounted on the first moveable support, and the first ends of the third and fourth parts are pivotably mounted on the second moveable support, and the drive system comprises one or more actuators arranged to pivot the second ends of the first and second parts towards the second guide assembly and to pivot the second ends of the third and fourth parts towards the first guide assembly.

In some examples the UAV transport mechanism further comprises first, second, third and fourth portions connected to the first, second, third and fourth parts respectively via one or more hinges, wherein the first and second portions are arranged to hinge as the second ends of the first and second parts move towards the second guide assembly and wherein the third and fourth portions are arranged to hinge as the second ends of the third and fourth parts move towards the first guide assembly.

In an arrangement, the first guide assembly further comprises a first guide rail and a second guide rail arranged substantially parallel to, and spaced apart from the first guide rail. An end of the first portion is slidably mounted on the first guide rail, such that the first portion moves along the first guide rail as the drive system moves the first guide assembly towards the second guide assembly and an end of the second portion is slidably mounted on the second guide rail, such that the second portion moves along the second guide rail as the drive system moves the first guide assembly towards the second guide assembly.

Similarly, the second guide assembly further comprises a third guide rail arranged substantially parallel to the first guide rail and a fourth guide rail arranged substantially parallel to, and spaced apart from the third guide rail. The third guide rail is spaced apart from the first guide rail along an axis arranged perpendicular to a plane defined by the platform and the fourth guide rail is spaced apart from the second guide rail along the axis. An end of the third portion is slidably mounted on the third guide rail, such that the third portion moves along the third guide rail as the drive system moves the second guide assembly towards the first guide assembly and an end of the fourth portion is slidably mounted on the fourth guide rail, such that the fourth portion moves along the fourth guide rail as the drive system moves the second guide assembly towards the first guide assembly. This means that the first guide rail is arranged above/below the third guide rail and that the second guide rail is arranged above/below the fourth guide rail. This arrangement allows the first and second guide assemblies to cross-over as they move towards each other.

A third embodiment will now be described in which another one-step movement occurs; however unlike the second embodiment, only one guide assembly may move towards the other.

In this embodiment the positioning mechanism for moving a UAV across a surface comprises a surface for receiving a UAV, wherein at least a portion of the surface delimits an aperture through which to receive or deposit a payload, a first guide assembly, a second guide assembly, wherein the first and second guide assemblies are arranged on opposite sides of the aperture, and a drive system. The drive system is arranged to move the first guide assembly towards the second guide assembly, thereby to guide the UAV from a first position to a second position, the second position being a position arranged above the aperture.

As for the second embodiment, the UAV positioning mechanism according to this third embodiment positions the UAV along the surface in a single step. For example, a UAV initially is placed or lands in a first unknown position which can be anywhere in the area between the first and second guide assemblies. Unlike in the second embodiment, the first guide assembly moves towards the second guide assembly to abut and push/guide the UAV towards an aperture in the surface (it will be recalled that in the second embodiment the UAV is guided towards a moveable platform). Here the UAV is in a known, second position, with respect to the aperture. When located in this second position, the aperture can be opened (if not already open) and the UAV may deposit or receive a payload (such as a package or battery) through the aperture. The positioning mechanism may be arranged on top of a container or within a container, for example.

The UAV positioning mechanism according to the third embodiment may comprise any or all of the features and components described in relation to the first and second embodiment.

Further features and advantages of the disclosure will become apparent from the following description of preferred embodiments of the disclosure, given by way of example only, which is made with reference to the accompanying drawings.

DETAILED DESCRIPTION OF CERTAIN INVENTIVE EMBODIMENTS

Figure 1:
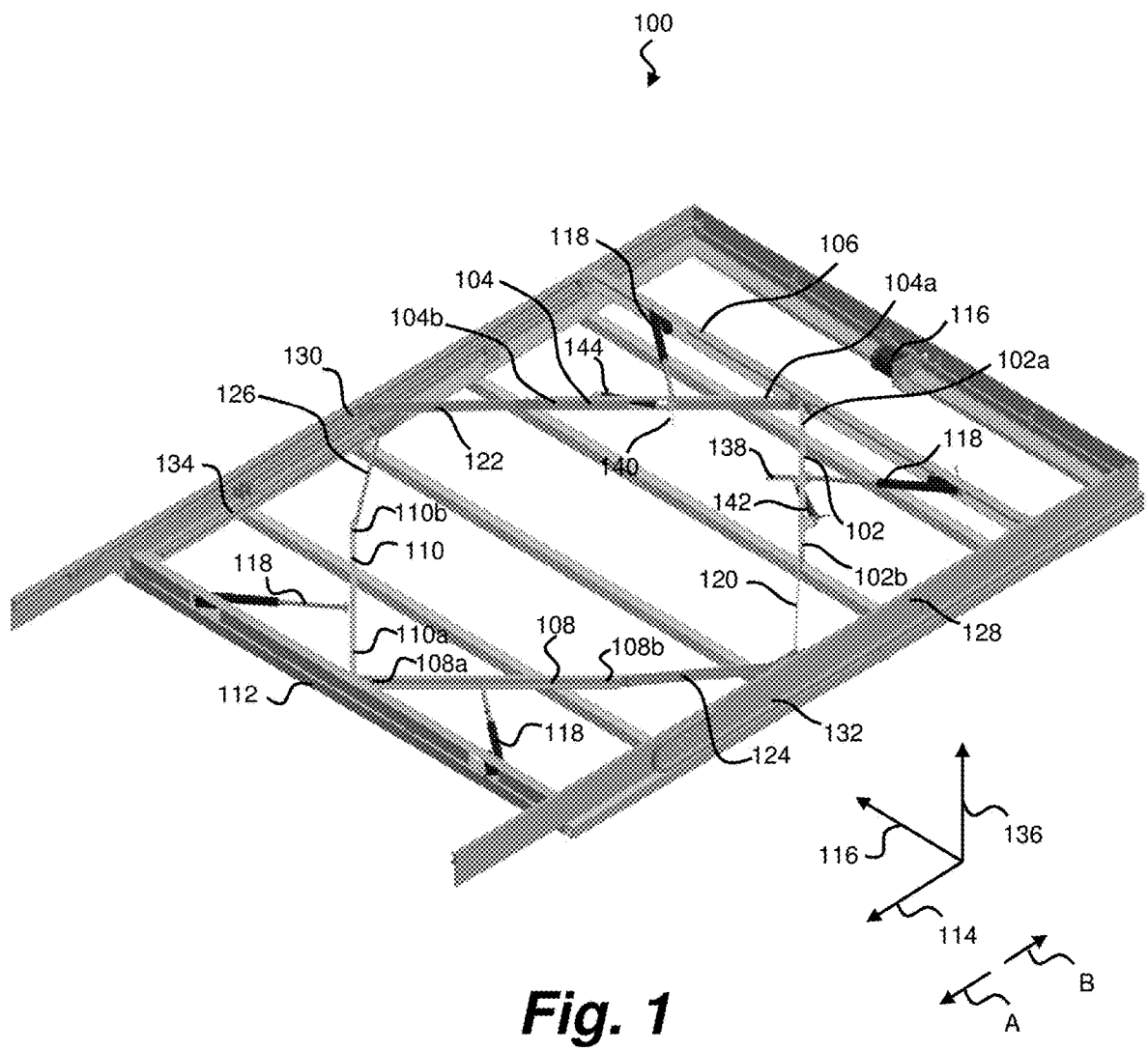
FIG. 1 is a perspective view of an unmanned aerial vehicle positioning/transport mechanism in accordance with an example.
Figure 11:
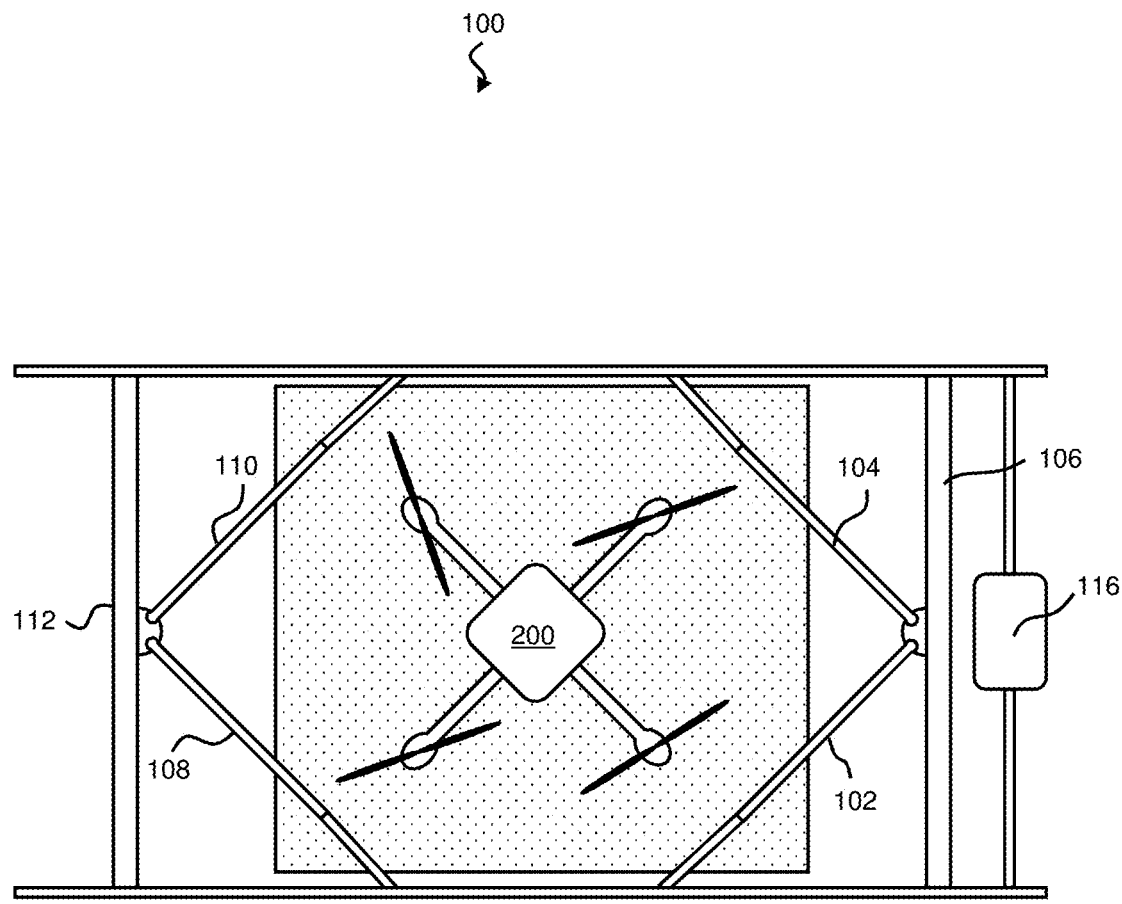
Figure 11:
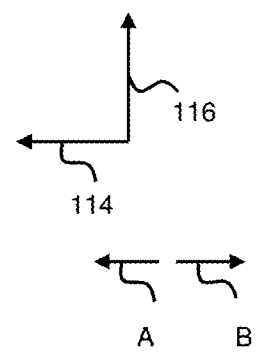
Figure 12:
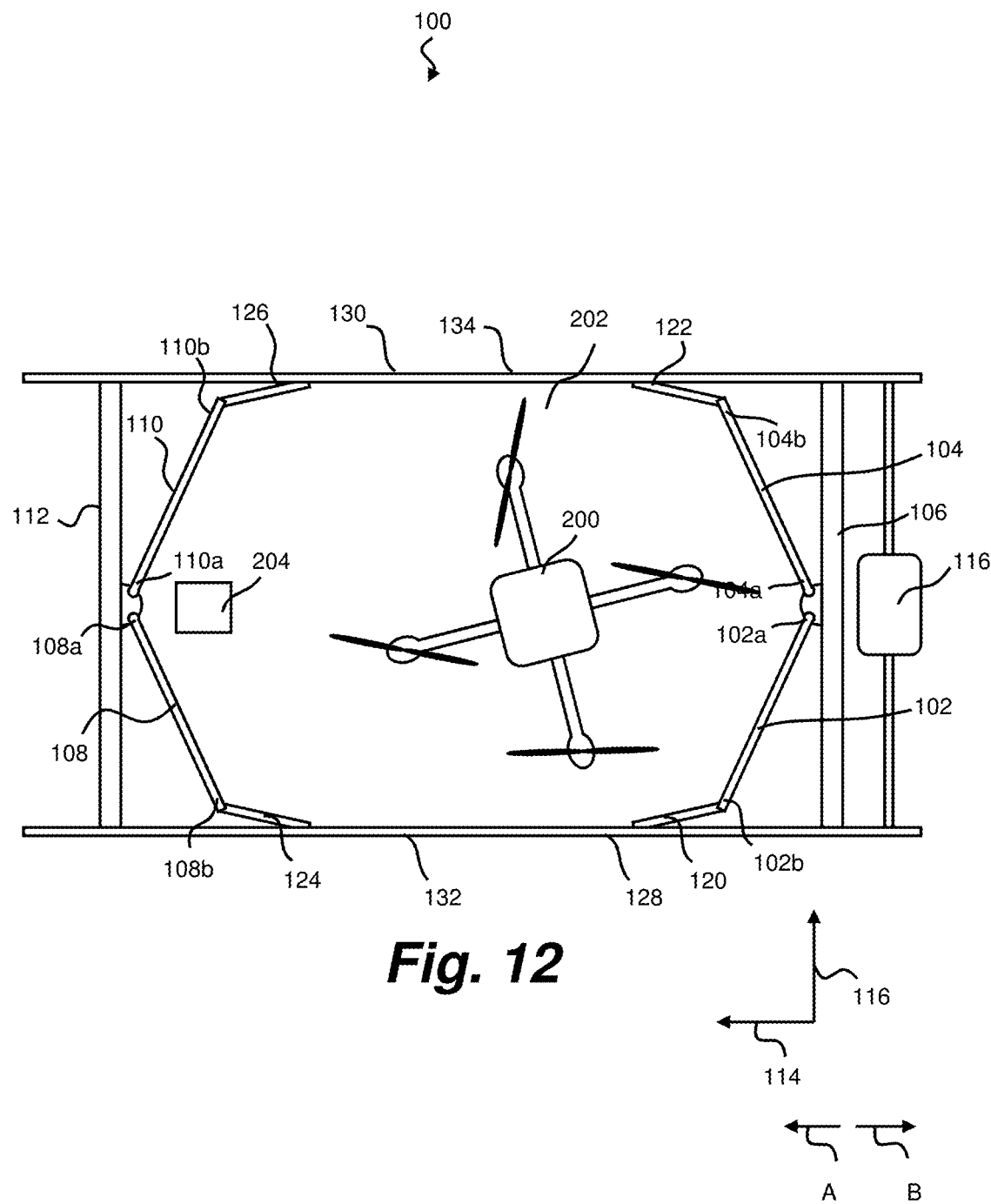
FIGS. 12-13 are plan views of a UAV being moved across a surface by a positioning mechanism at various stages in the process in accordance with a third embodiment.
Figure 13:
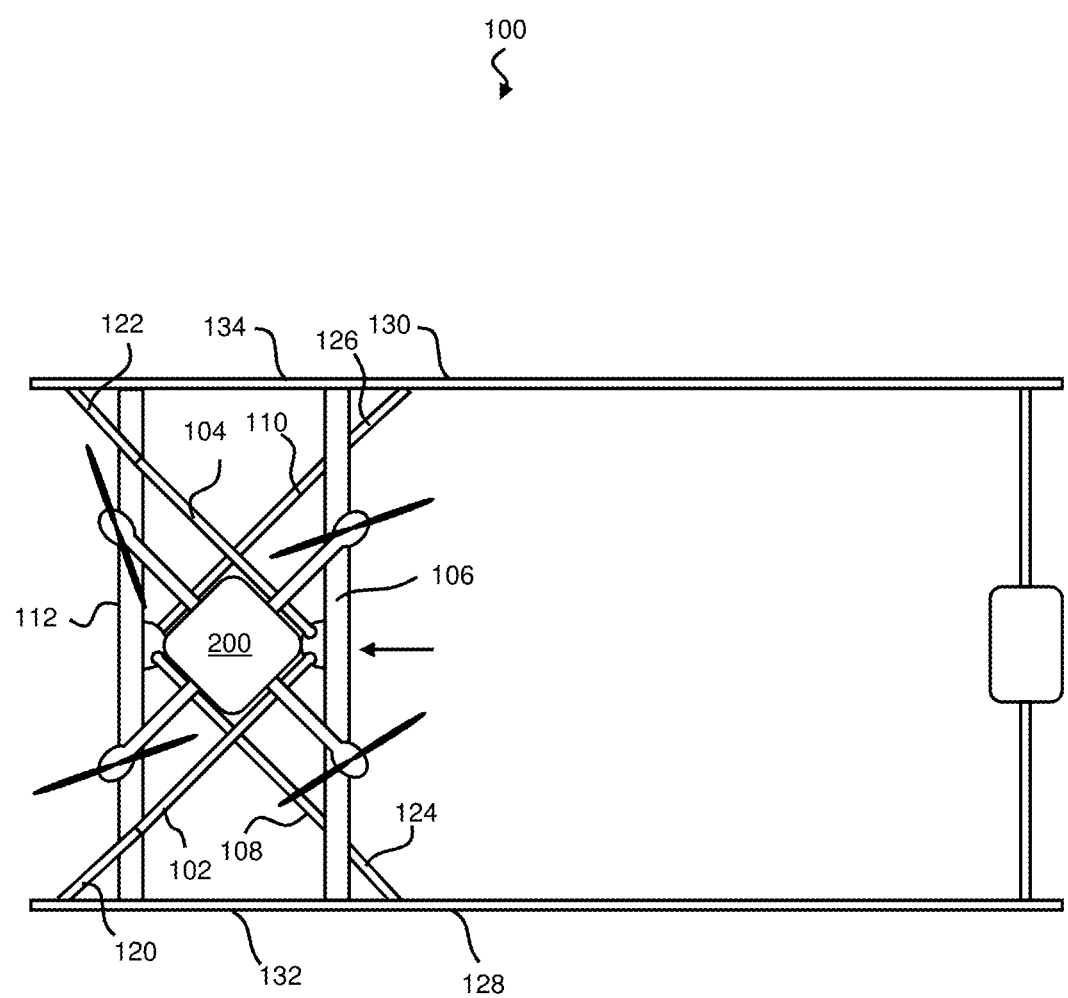
Figure 13:
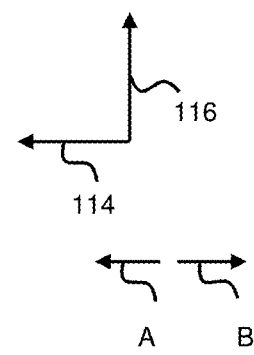

Disclosed are a variety of UAV positioning/transport mechanisms for moving a UAV across a surface to ensure that the UAV is precisely positioned. FIG. 1 depicts a UAV positioning/transport mechanism comprising a guide assembly arrangement which moves across the surface to position the UAV. FIGS. 2-7 depict the operation of the UAV positioning/transport mechanism of FIG. 1 in accordance with a first embodiment. FIGS. 8-11 depict the operation of the UAV positioning/transport mechanism of FIG. 1 in accordance with a second embodiment. FIGS. 12-13 depict the operation of the UAV positioning/transport mechanism of FIG. 1 in accordance with a third embodiment.

The UAV positioning mechanism 100 may also be known as a transport mechanism. The components of the positioning mechanism 100 are used to move and position a UAV across a surface (not shown in FIG. 1) after the UAV has landed or been placed upon the surface. A drive system, which may include a controller such as a processor, controls operation of the positioning mechanism 100 to position the UAV.

In the example of FIG. 1, the positioning mechanism 100 comprises a first guide assembly and a second guide assembly spaced apart from the first guide assembly. The first guide assembly comprises a first part 102, a second part 104 and a first support 106. Similarly, the second guide assembly comprises a third part 108, a fourth part 110 and a second support 112. In some embodiments the first support 106 is a moveable support, and it moves along a first axis 114 in both a first direction towards the second guide assembly and in a second direction away from the second guide assembly. In some embodiments the second support 112 is a moveable support, and also moves along the first axis 114. In other embodiments however, the second support 112 remains stationary and does not move along the first axis 114.

The positioning mechanism 100 may further comprise a drive system arranged to move either or both of the first and second guide assemblies. For example, the drive system may comprise a number of actuators, motors, gears, pistons, and such like, to move any component of the positioning mechanism 100. The drive system may also comprise a locally or remotely located controller 116, such a processor, which instructs and controls the movement of the positioning mechanism 100. The controller 116 of the drive system is depicted at one end of the positioning mechanism 100, and since the controller 116 controls operation of the drive system, it may represent the drive system itself for illustrative purposes.

As mentioned, the drive system may be arranged to move the first guide assembly in the first and second directions. The first direction is represented by an arrow "A" and the second direction is represented by an arrow "B". For example, the drive system may cause the first support 106 to move in the first and second directions by operating one or more of a motor, actuator or piston to cause the first support 106 to move. Similarly, in embodiments where the second guide assembly also moves, the drive system may be arranged to move the second guide assembly in the first and second directions. For example, the drive system may cause the second support 112 to move.

In FIG. 1, the positioning mechanism 100 is depicted without a landing surface, and the first and second guide assemblies define an area between them within which the UAV may be moved. However, it will be appreciated that the depicted area represents a suitable surface upon which the UAV may land or be placed, and over which the UAV is thereafter moved by the positioning mechanism 100. In some examples the positioning mechanism 100 may itself comprise the surface.

In the example of FIG. 1, the first part 102 and the second part 104 are separate components and are mounted onto the first support 106. However in other examples, the first and second parts 102, 104 may be parts of a single entity which is mounted onto the first support 106. The same may be said of the third and fourth parts 108, 110.

In some embodiments the first, second, third and fourth parts 102, 104, 108, 110 are permanently fixed in the positions depicted in FIG. 1, i.e. an angle is subtended between the first and second supports 106, 112 and their respective parts. However, preferably, the parts are moveable with respect to the first and second supports 106, 112.

In FIG. 1, the first part 102 has a first end 102a and a second end 102b, and the first end 102a is mounted on the first support 106. For example, the first end 102a may be pivotably mounted on the first support 106. This allows the first part 102 to rotate with respect to the first support 106. Accordingly, the first part 102 can pivot in a plane defined by the first axis 114 and a second axis 116 arranged perpendicular to the first axis 114. This rotation means that the second end 102b moves towards the second guide assembly as it rotates away from the first support 106. The first end 102a does not move away from the first support 106 as it is fixed by the pivot. Similarly, the second part 104 has a first end 104a and a second end 104b, and the first end 104a is mounted on the first support 106. For example, the first end 104a may be pivotably mounted on the first support 104 by the same or a different pivot. This too allows the first part 104 to rotate with respect to the first support 106.

The third part 108 and the fourth part 110 may operate in a similar manner. For example, the third part 108 has a first end 108a and a second end 108b, and the first end 108a is mounted on the second support 112. For example, the first end 108a may be pivotably mounted on the second support 112 by a pivot. Again, this allows the third part 108 to rotate with respect to the second support 112. This rotation means that the second end 108b moves towards the first guide assembly as it rotates away from the second support 112. Similarly, the fourth part 110 has a first end 110a and a second end 110b, and the first end 110a is mounted on the second support 112. For example, the first end 110a may be pivotably mounted on the second support 110 by the same or different pivot.

The above movement/rotation can be effectuated by one or more motors, pistons and/or actuators which are part of the drive system. In FIG. 1, four actuators 118 are depicted, two mounted on each of the first and second supports 106, 112. The actuators 118 therefore control rotation of the first, second, third and fourth parts 102, 104, 108, 110.

In some examples, the first part 102 may be connected to a first portion 120 via a hinge. For example, the second end 102b of the first part 102 may be connected to the hinge. The first part 102 may therefore pivot with respect to the first portion 120. The second part 104 may also be connected to a second portion 122 via a hinge. For example, the second end 104b of the second part 104 may be connected to the hinge. The second part 104 may therefore also pivot with respect to the second portion 122. Similarly, the third part 108 may be connected to a third portion 124 via a hinge and the fourth part 110 may also be connected to a fourth portion 126 via a hinge.

The first part 102 and the first portion 120 may collectively define, and be referred to, as a first arm. Similarly, the second part 104 and the second portion 122 may collectively define, and be referred to, as a second arm; the third part 108 and the third portion 124 may collectively define, and be referred to, as a third arm; and the fourth part 110 and the fourth portion 126 may collectively define, and be referred to, as a fourth arm. These hinged portions allow the arms to bend and fold into a more compact space while retaining a length sufficient to span across the width of the surface when angled with respect to the supports 106, 112.

FIG. 1 also depicts four guide rails 128, 130, 132, 134 along which ends of the first, second, third and fourth portions 120, 122, 124, 126 can move. More particularly, the first guide assembly comprises a first guide rail 128, and a second guide rail 130 arranged substantially parallel to and spaced apart from the first guide rail 128. In FIG. 1 the guide rails are substantially straight and are aligned with the first axis 114; however the guide rails may be curved and/or arranged at angle with respect to the first axis 114. The first guide rail 128 is located on an inner surface of a chassis of the UAV positioning mechanism and is therefore obscured from view. The second guide rail 130 is more clearly depicted on the opposite side of the chassis. As can be seen, an end of the second portion 122 is slidably mounted on the second guide rail 130 which allows the second portion 122 to move along the second guide rail 130 as the first guide assembly (i.e. the first support 106) moves along the first axis 114. In embodiments where the second arm comprises only the second part 104 (i.e. the second portion 122 is omitted), the second end 104b of the second part 104b may instead be slidably mounted on the second guide rail 130. In the same way, an end of the first portion 120 is slidably mounted on the first guide rail 128 or the second end 102b of the first part 102 may instead by mounted on the first guide rail 128.

The second guide assembly may further comprise a third guide rail 132, and a fourth guide rail 134 arranged substantially parallel to and spaced apart from the third guide rail 132. The third guide rail 132 may therefore be parallel to the first guide rail 128 and the fourth guide rail 134 may be parallel to the second guide rail 130. In FIG. 1, the first and third guide rails 128, 132 are spaced apart from each other along a third axis 136, which is arranged perpendicular to both the first and second axes 114, 116. Similarly, the fourth guide rail 134 is spaced apart from the second guide rail 130 along the third axis 136. When the landing surface is substantially horizontal the third axis 136 may therefore be aligned substantially vertically meaning that the first and third guide rails 128, 132 are arranged at different heights to each other, and that the second and fourth guide rails 130, 134 are arranged at different heights to each other. This allows the first guide assembly to move above or below, and therefore cross-over the second guide assembly. FIG. 1 shows the first guide assembly being arranged above the second guide assembly; however in other examples the second guide assembly may be arranged above the first guide assembly.

In some examples, the first and/or second supports 106, 112 are also moveably mounted on the guide rails. For example, one end of the first support 106 may mounted on the first guide rail 128 and another end of the first support 106 may be mounted on the second guide rail 130. In embodiments where the second support 112 also moves, one end of the second support 112 may mounted on the third guide rail 132 and another end of the second support 112 may be mounted on the fourth guide rail 134. In other embodiments, separate/additional guide rails may be used. By mounting the first and/or second supports 106, 112 on the guide rails, the supports can move along the first axis 114.

In certain embodiments, such as the first embodiment described below, the first part 102 has a first retaining member 138 connected thereto and the second part 104 has a second retaining member 140 connected thereto. In other embodiments, such as the second and third embodiments described below, the retaining members may be omitted. The first and second retaining members 138, 140 are arranged to engage a UAV such that the UAV moves with the first guide assembly as it moves along the first axis 114. The retaining members 138, 140 depicted in FIG. 1 are moveable between a first configuration and a second configuration. In the first configuration, the first and second retaining members 138, 140 are arranged substantially parallel to the first and second parts 102, 104, respectively. In the second configuration, the first and second retaining members 138, 140 extend from and define an angle between the first and second parts 102, 104, respectively. FIG. 1 shows the retaining members 138, 140 in the second configuration as they have been rotated/pivoted away from the first and second parts 102, 104. The first and second retaining members 138, 140 may therefore be pivotably mounted on the first and second parts 102, 104 respectively. Two actuators 142, 144, which are part of the drive system, control the pivoting motion of the retaining members 138, 140 between the first and second configurations.

The positioning mechanism 100 in FIG. 1 may be constructed fully or partially from any suitably rigid or semi-rigid material that is capable of withstanding impact with the UAV and moving the UAV. For example, the components may be constructed from metal, plastic, and/or wood.

Figure 2:
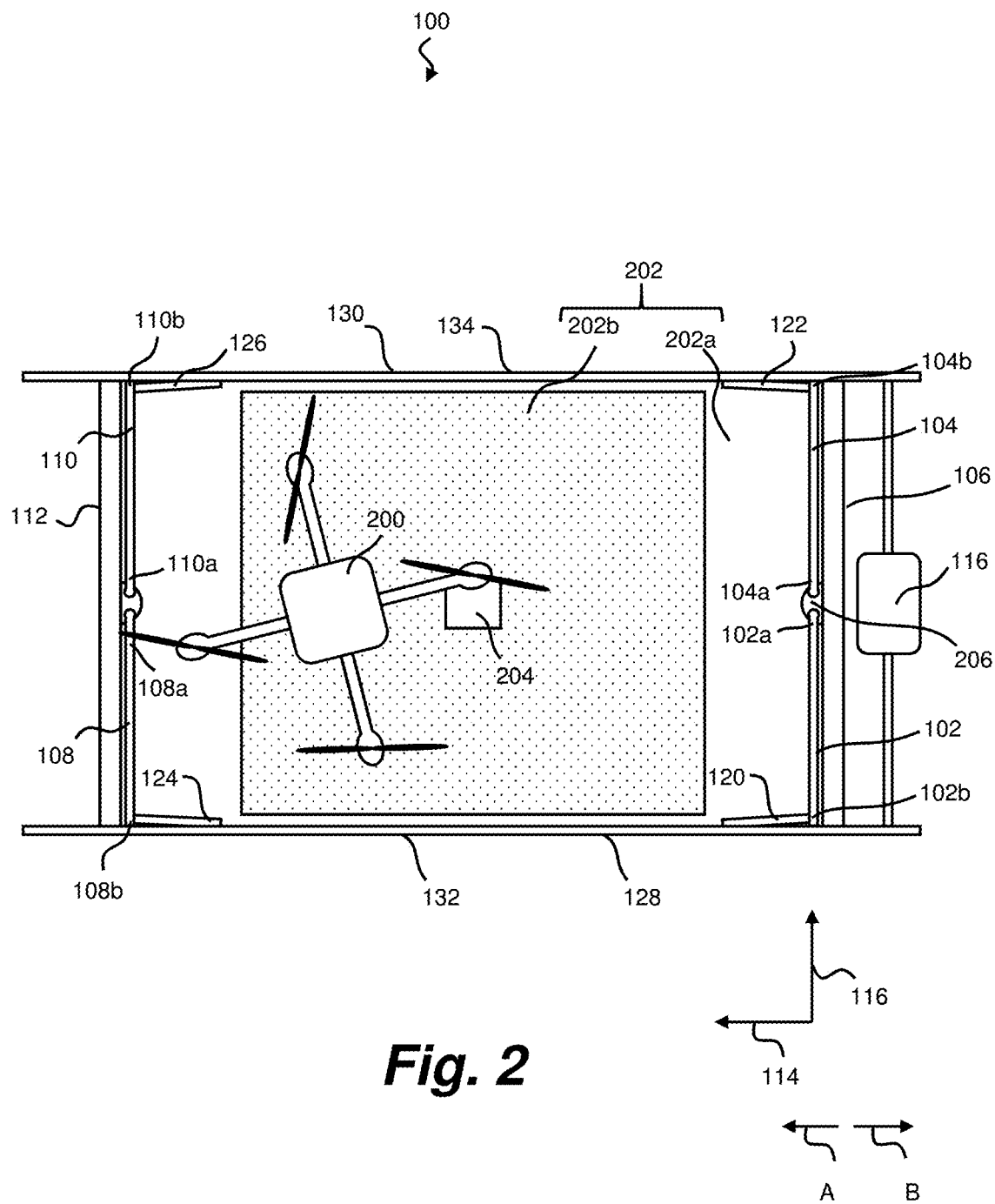
FIGS. 2-7 are plan views of a UAV being moved across a surface by a positioning mechanism at various stages in the process in accordance with a first embodiment.

FIGS. 2-7 relate to a first operational embodiment of the positioning mechanism of FIG. 1. FIG. 2 depicts a positioning mechanism 100 arranged upon a surface 202, which may also be known as a landing surface. In this example, the surface 202 is modular, and comprises a fixed surface part 202a and a moveable platform 202b (depicted with shading). The moveable platform 202b has a substantially flat upper surface and is coplanar with the fixed surface part 202a in this position. The moveable platform 202b may delimit an aperture 204 through which a payload may be collected or deposited. In some cases it is desirable to position a UAV 200 so that it is arranged on the moveable platform 202b and/or arranged above the aperture 204. The aperture 204 may be closeable. For example, one or more members may be moved to close the aperture 204.

FIG. 2 depicts the positioning mechanism 100 at a first moment in time. At this time, a UAV 200 has landed, or otherwise been placed upon the surface 202 in an area between the first and second guide assemblies. The UAV 200 may therefore be said to be initially located in a first position. As can be seen, the first and second guide assemblies are in an initial, folded, configuration which maximizes the area within which the UAV 200 can land. In this initial folded configuration, the first part 102 and the second part 104 are arranged generally parallel to the first support 106. The first and second parts 102, 104 are sized to be approximately half of the length of the first support 106. As described above, the first end 102a of the first part 102 is pivotably mounted on the first support 106. Similarly, the first end 104a of the second part 104 is pivotably mounted on the first support 106. For example, the first and second parts 102, 104 are indirectly connected to the first support 106 by a connector 206. As was described above, a first portion 120 is pivotably connected to the first part 102 at the second end 102b, and a second portion 122 is pivotably connected to the second part 104 at the second end 104b. In this initial folded configuration, the first portion 120 is arranged generally perpendicular to the first part 102 while being mounted on the first guide rail 128, and the second portion 122 is arranged generally perpendicular to the second part 104 while being mounted on the second guide rail 130.

In some examples, the positioning mechanism 100 comprises one or more sensors (not shown) which detect the presence of the UAV 200 on, or near, the surface 202. For example, pressure sensors in the surface, or movement sensors located near the positioning mechanism 100 may detect that the UAV 200 has landed or is about to land. In another example, the UAV 200 may wirelessly transmit a message which is directly or indirectly received by the positioning mechanism 100 which informs the positioning mechanism 100 that the UAV 200 has landed or is about to land. For example, the controller 116 may receive data which informs the controller 116 that a UAV 200 requires positioning. In other examples, the positioning mechanism may operate in response to an instruction from a human operator.

Once the positioning mechanism 100 has detected the presence of the UAV 200 or has otherwise been instructed to begin operating, the positioning mechanism 100 may begin to execute a procedure to move the UAV 200 from the first position to a third position via a second position.

Figure 3:
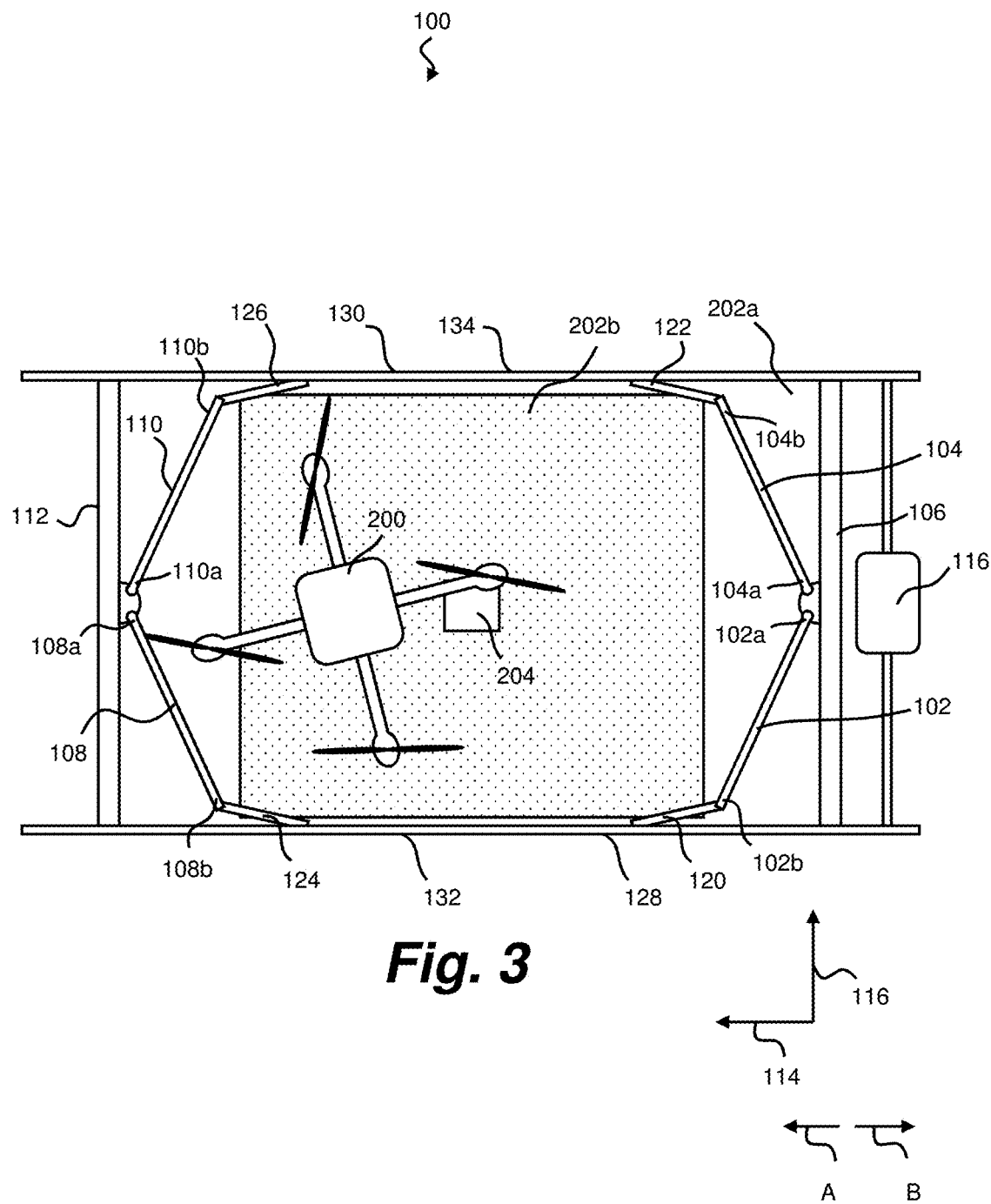

FIG. 3 depicts the positioning mechanism 100 at a second, later moment in time. At this time, the UAV 200 is located in the first position and the positioning mechanism 100 has started to execute a positioning procedure to relocate the UAV 200.

As can be seen, the first and second guide assemblies have begun to unfold. To unfold, the drive system has caused the second ends 102b, 104b of the first and second parts 102, 104 to move towards the second guide assembly by causing the parts to rotate away from the first support 106. This step may be executed before, during or after movement of the first support 106 in the first direction towards the second guide assembly. Similarly, the drive system has caused the second ends 108b, 110b of the third and fourth parts 108, 110 to move towards the first guide assembly by causing the parts to rotate away from the second support 112. These rotational movements may be effectuated by one or more actuators 118 (not shown in FIG. 3) or by any other means.

Causing the first, second, third and fourth parts 102, 104, 108, 110 to rotate away from the first and second supports 106, 112 causes the respective first, second, third and fourth portions 120, 122, 124, 126 to hinge/pivot and slide along the guide rails 128, 130, 132, 134. Alternatively, the drive system may actively cause these portions to slide along the guide rails as the first, second, third and fourth parts 102, 104, 108, 110 rotate away from the first and second supports 106, 112. This initial rotation causes the area between the first and second guide assemblies to reduce in size.

Thus, in the configuration depicted in FIG. 3, the first part 102 and the second part 104 are no longer arranged parallel to the first support 106. Instead, they have rotated away from the first support 106 to define an angle therebetween. The first arm and the second arm have therefore begun to straighten out. Similarly, the third part 108 and the fourth part 110 are no longer arranged parallel to the second support 112. Instead, they have rotated away from the second support 112 to define an angle therebetween. The third arm and the fourth arm have therefore also begun to straighten out. The unfolding of the arms may occur in unison, or in sequence.

Figure 4:
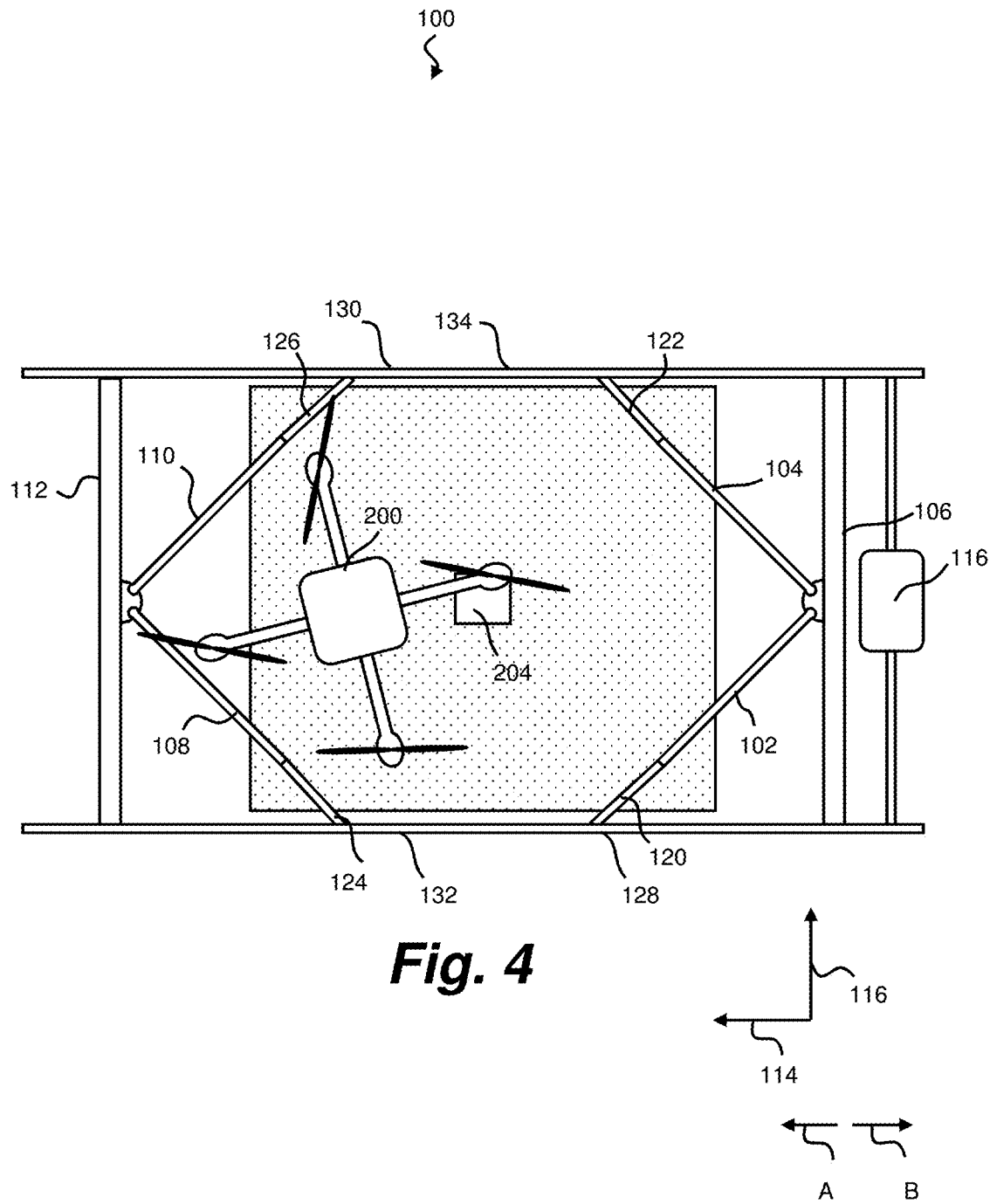

FIG. 4 depicts the positioning mechanism 100 at a third, later moment in time. At this time, the UAV 200 is still located in the first position.

As can be seen, the first and second guide assemblies have now fully unfolded. The first, second, third and fourth arms have therefore fully straightened out. By straightening out, the first part 102 and the first portion 120 are substantially parallel. Similarly, the second part 104 and the second portion 122, the third part 108 and the third portion 124, and the fourth part 110 and the fourth portion 126 are also substantially parallel. To fully unfold, the drive system has further caused the second ends 102b, 104b of the first and second parts 102, 104 to move towards the second guide assembly by causing the parts to rotate away from the first support 106. Similarly, the drive system has further caused the second ends 108b, 110b of the third and fourth parts 108, 110 to move towards the first guide assembly by causing the parts to rotate away from the second support 112. This further rotation causes the area between the first and second guide assemblies to continue to reduce in size.

Figure 5:
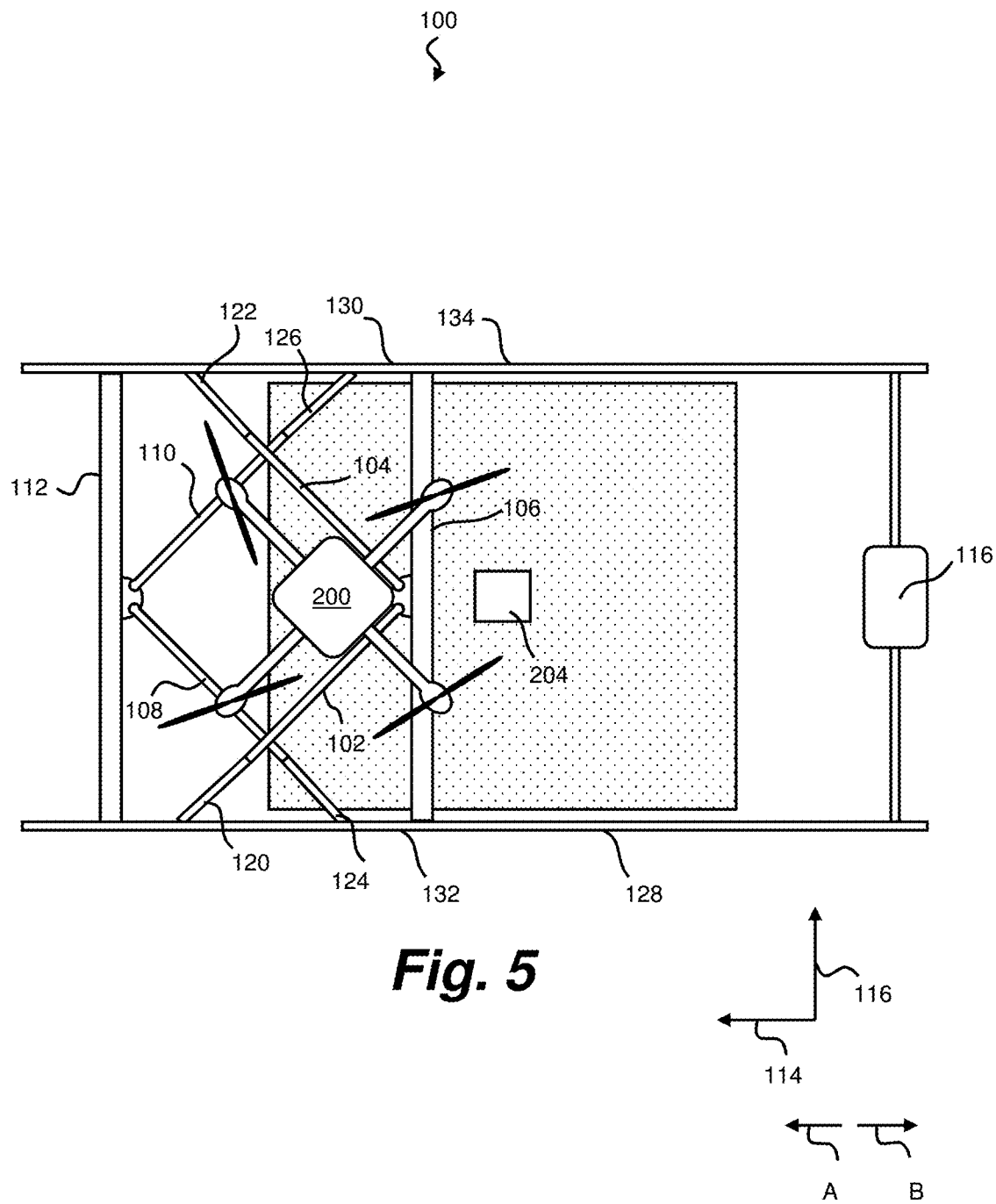

FIG. 5 depicts the positioning mechanism 100 at a fourth, later moment in time. As can be seen, the drive system has begun to move the first guide assembly in the first direction towards the second guide assembly by causing the first, moveable support 106 to move along the first axis 114 in the first direction towards the second guide assembly.

As previously mentioned, the vertical offset of the guide rails 128, 130, 132, 134 allows the first guide assembly to pass above/below the second guide assembly. FIG. 5 shows the first part 102 having crossed over the third part 108 and the second part 104 having crossed over the fourth part 110.

In the position shown in FIG. 5, the first guide assembly has abutted through direct contact with the UAV 200. The angled nature of the first and second parts 102, 104 and the movement in the first direction funnels or guides the UAV 200 towards the center of the first support 106. This guiding occurs when the UAV is not positioned centrally upon the surface 202 as measured along the second axis 116. The angled nature and combined movement in the first direction also causes the UAV 200 to rotate so that the surfaces of the body of the UAV are aligned with the first and second parts 102, 104. It should be noted however that rotation may not necessarily occur if the body of the UAV 200 is e.g. of a circular cross section. FIG. 5 therefore shows the UAV 200 in a slightly different position to that shown in FIGS. 2-4 because the UAV 200 has contacted the first guide assembly and has begun its trajectory towards a second, intermediate position depicted in FIG. 6.

Figure 6:
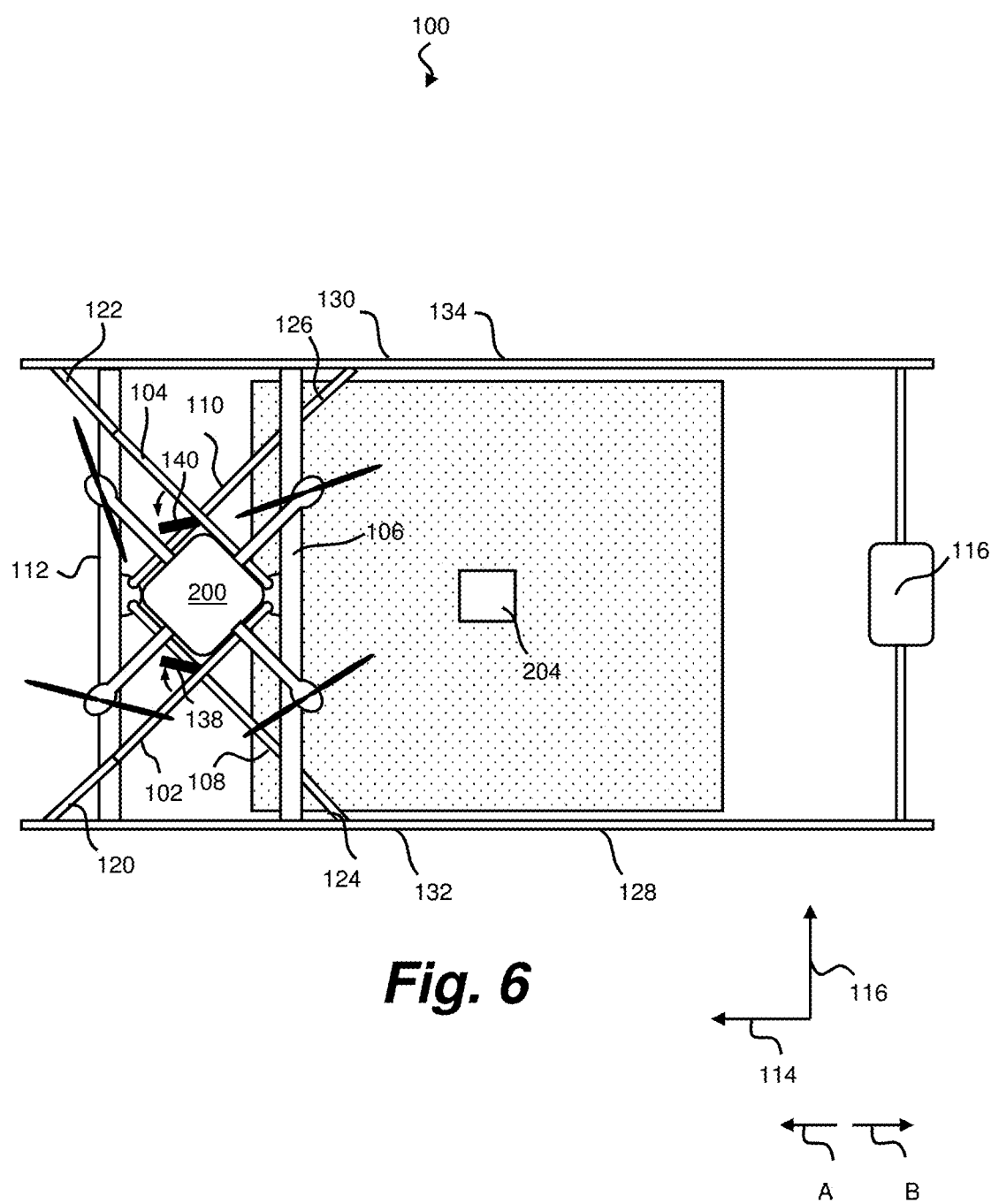

FIG. 6 depicts the positioning mechanism 100 at a fifth, later moment in time. As can be seen, the first guide assembly has moved as far as it can in the first direction. Further movement is restricted by the UAV 200 and/or the size constraints of the positioning mechanism 100. The UAV 200 may therefore be said to be located in a second position. Regardless of where on the surface 202 the UAV 200 was located initially, the second position will always be the same. The second position is therefore a known position because it is constant for each positioning event.

In this second position, the UAV 200 abuts both the first and second guide assemblies. In some examples, the first support 106 (and therefore the first guide assembly) stops moving in the first direction when the first or second arms reach the end of the first and second guide rails 128, 130 respectively. In some examples, the drive system actively causes the first guide assembly to stop moving. For example, the drive system may be configured to stop once it has moved the first guide assembly by a certain distance, or it may stop the movement in response to a signal. For example, one or more sensors may detect that the UAV 200 has been moved into the second position and based on sensor data, the drive system may stop the movement.

Once in this second position, the first and second retaining members 138, 140 are caused to engage the UAV 200. In FIGS. 2-5, the retaining members 138, 140 are obscured from view because they are arranged to be coplanar with inner surfaces of the first and second parts 102, 104 respectively. In the example of FIG. 6, the retaining members 138, 140 have partially pivoted away from the first and second parts 102, 104 towards the UAV 200. The drive system can initiate this procedure once the UAV 200 is positioned in the second position. The retaining members 138, 140 are configured to rotate outwards until they contact and engage the UAV 200. The retaining members may be constructed of the same or different material to that of the first and second parts 102, 104. In some examples, additional grip is provided by a gripping surface located on the retaining members 138, 140. The gripping surface may comprise rubber for example, and provides frictional contact with and to ensure that the UAV 200 will move with the first guide assembly. In some examples the retaining members 138, 140 do not pivot and rotate outwards from the first and second parts 102, 104. Instead, they may extend and retract out of a surface of the first and second parts 102, 104 in e.g. a telescopic manner. In some examples the retaining members 138, 140 may protrude outwards to engage corresponding recesses located on the outer surface of the UAV 200. Alternatively, the retaining members 138, 140 may themselves be recesses and corresponding protruding members on the UAV may engage the recesses. It will therefore be appreciated that the retaining members 138, 140 depicted may take any suitable form. Once engaged, the UAV 200 may be moved from this second, intermediate position, to a third position.

Figure 7:
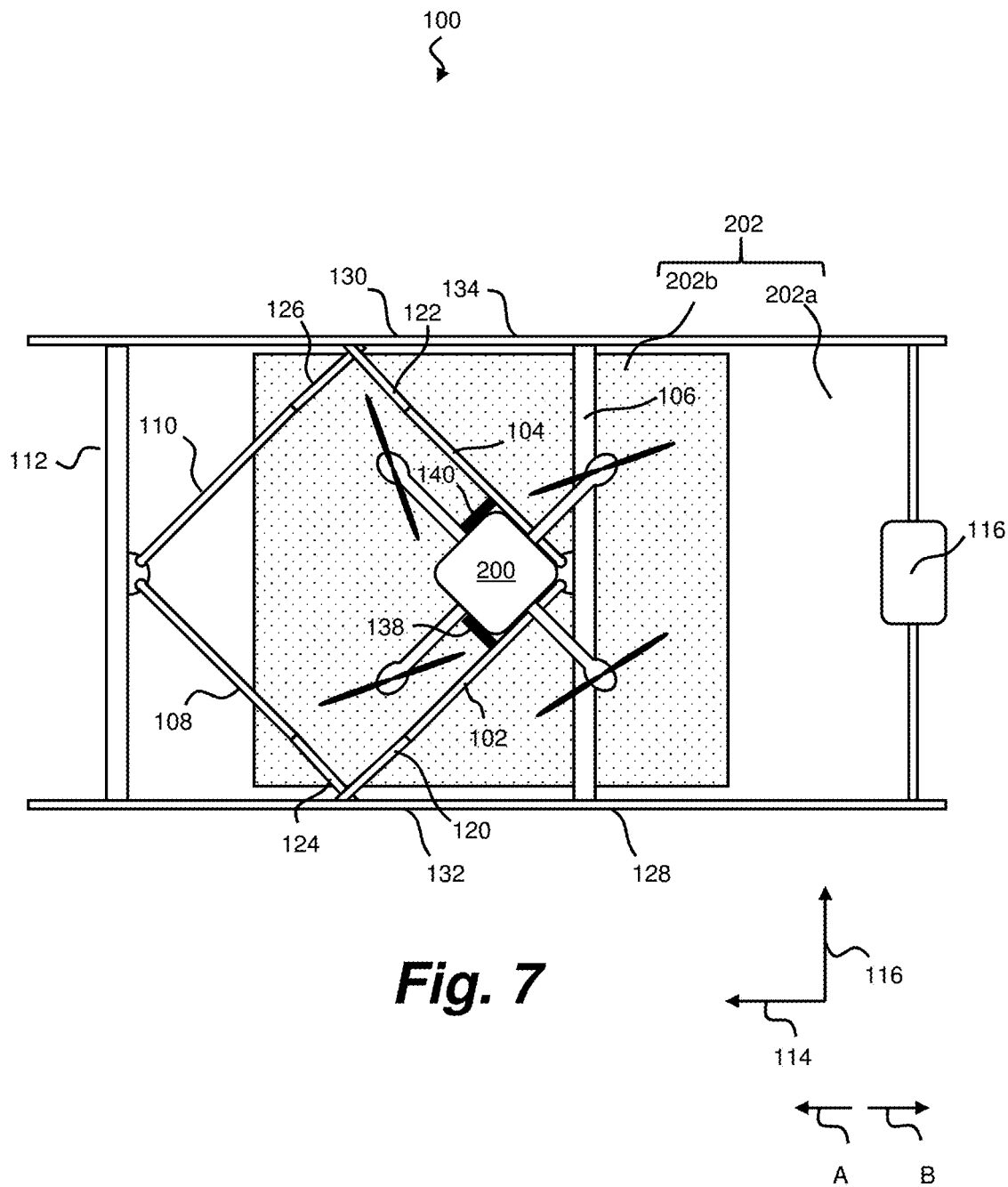

FIG. 7 depicts the positioning mechanism 100 at a sixth, later moment in time. As can be seen, the first guide assembly has moved in the second direction and away from the second guide assembly. The first and second retaining members 138, 140 have fully rotated and engaged the UAV 200, such that the UAV 200 moves with the first guide assembly in the second direction towards a third position. In FIG. 7, the third position is located generally centrally upon the landing surface 202, however the third position may be anywhere upon the surface 202 as is required. Because the UAV 200 is being carried with the first guide assembly, and the first guide assembly can be controlled to stop precisely in any location, the third position is therefore also a known position.

To move the UAV 200 into this third position, the drive system has moved the first support 106 (and therefore the first guide assembly) in the second direction. In some examples, the first support 106 (and therefore the first guide assembly) stops moving in the second direction when the drive system actively causes the first guide assembly to stop moving. For example, the drive system may be configured to stop once it has moved the first guide assembly by a certain distance, or it may stop the movement in response to a signal. For example, one or more sensors may detect that the UAV 200 has been moved into the third position and based on sensor data, the drive system may stop the movement.

As mentioned, in some examples, the surface 202 may comprise a moveable platform 202b forming part of the surface 202. In such examples, the third position may be located on the platform 202b. FIG. 7 shows the third position located towards the center of the moveable platform 202b which ensures the rotors of the UAV 200 do not collide with the fixed surface portion 202a of the surface when the platform 202b moves to a position below the rest of the surface (i.e. below the fixed surface portion 202a).

Once located in the third position, the first and second retaining members 138, 140 may be configured to disengage the UAV and the first and second guide assemblies may be configured to return to their original starting positions (i.e. that which is depicted in FIG. 2). Thus, the first guide assembly may move away from the UAV in the second direction. This can prepare the positioning mechanism for a subsequent positioning procedure and/or ensure that the first and second guide assemblies to not obstruct the rotor blades of the UAV 200 as the moveable platform 202b is lowered.

Once located in the third position, the drive system can be arranged to lower the platform 202b along an axis arranged perpendicular to a plane defined by the platform 202b (i.e. along the third axis 116), thereby to lower the UAV 200 with respect to the surface 202.

FIGS. 8-11 relate to a second operational embodiment of the positioning mechanism of FIG. 1. In this second embodiment, both the first and second guide assemblies move towards each other.

Figure 8:
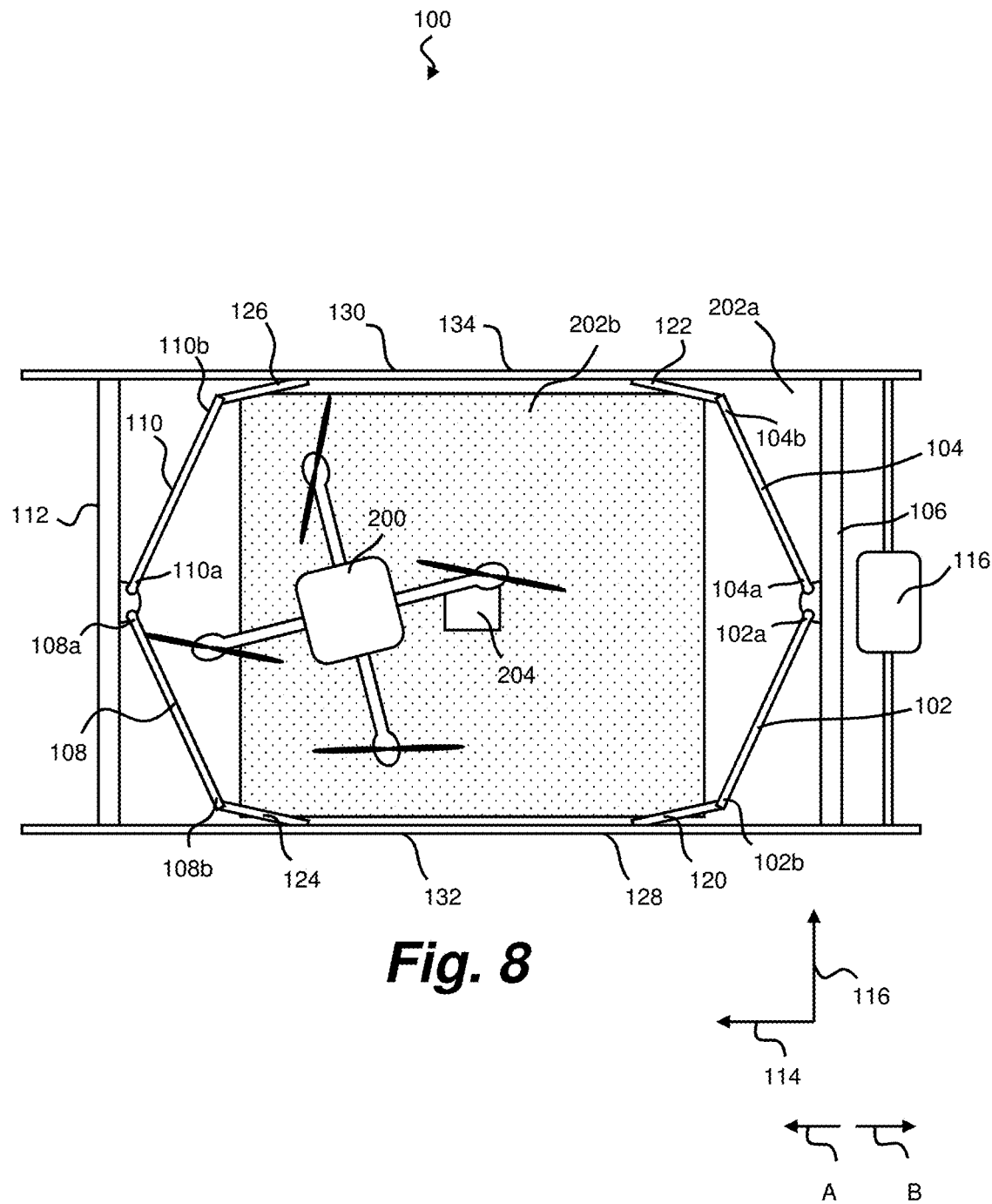
FIGS. 8-11 are plan views of a UAV being moved across a surface by a positioning mechanism at various stages in the process in accordance with a second embodiment.

FIG. 8 depicts a positioning mechanism 100 arranged upon a surface 202, which may also be known as a landing surface. In this example, the surface 202 is modular, and comprises a fixed surface part 202a and a moveable platform 202b (depicted with shading). The moveable platform 202b has a substantially flat upper surface and is coplanar with the fixed surface part 202a in this position. The moveable platform 202b may delimit an aperture 204 through which a payload may be collected or deposited. In some cases it is desirable to position a UAV 200 so that it is arranged on the moveable platform 202b and/or arranged above the aperture 204.

For brevity, the positioning mechanism 100 at a first moment in time is not depicted because it corresponds substantially that depicted in FIG. 2. In the initial, folded configuration, the first and second guide assemblies are arranged on opposite sides of the moveable platform 202b. FIG. 8 therefore depicts the positioning mechanism 100 at a second, later moment in time. At this time, the UAV 200 has landed, or otherwise been placed upon the surface 202 in an area between the first and second guide assemblies. The UAV 200 may therefore be said to be initially located in a first position (also known as a landing position). At this time, the positioning mechanism 100 has started to execute a positioning procedure to relocate the UAV 200. The UAV may begin the procedure in the same or different way to that described in relation to the first embodiment.

As can be seen, the first and second guide assemblies have begun to unfold. To unfold, the drive system has caused the second ends 102b, 104b of the first and second parts 102, 104 to move towards the second guide assembly by causing the parts to rotate away from the first support 106. Similarly, the drive system has caused the second ends 108b, 110b of the third and fourth parts 108, 110 to move towards the first guide assembly by causing the parts to rotate away from the second support 112. These rotational movements may be effectuated by one or more actuators 118 (not shown in FIG. 8) or by any other means. These steps may be executed before, during or after movement of the first support 106 and second support 112. Movement of the first, second, third and fourth parts 102, 104, 108, 110 is substantially similar to that described in relation to FIG. 3.

Figure 9:
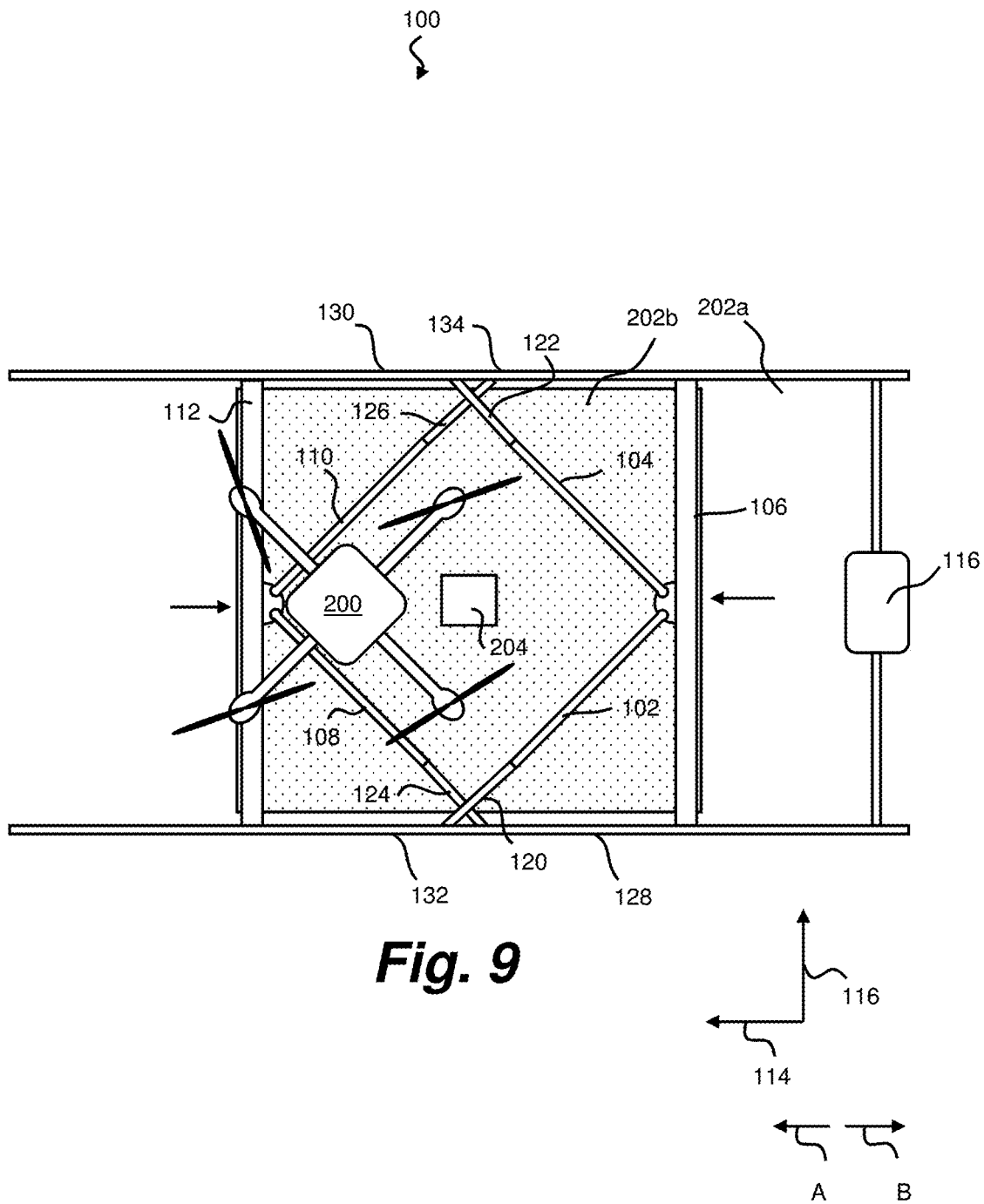

From this position, the drive system is configured to move the first and second guide assemblies towards each other. FIG. 9 depicts the positioning mechanism 100 at a third, later moment in time. At this time, the first and second guide assemblies have now fully unfolded in a way substantially similar to that described in relation to FIG. 4. In addition, the drive system has begun to move the first guide assembly in the first direction towards the second guide assembly by causing the first, moveable support 106 to move along the first axis 114 in the first direction. Similarly, the drive system has begun to move the second guide assembly in the second direction towards the first guide assembly by causing the second, moveable support 112 to move along the first axis 114 in the second direction. Movement of the moveable supports 106, 112 therefore cause the first and second guide assemblies to move towards each other.

As previously mentioned, the vertical offset of the guide rails 128, 130, 132, 134 allows the first guide assembly to pass above/below the second guide assembly. FIG. 9 shows the first portion 120 crossing over the third portion 124 and the second portion 122 crossing over the fourth portion 126. This allows the first and second guide assemblies to more closely come together.

In the position shown in FIG. 9, the second guide assembly has abutted and therefore come into contact with the UAV 200. The angled nature of the third and fourth parts 108, 110 and the movement in the second direction funnels or guides the UAV 200 towards the center of the second support 112. This guiding occurs when the UAV is not positioned centrally upon the surface 202 as measured along the second axis 116. The angled nature and combined movement in the second direction also causes the UAV 200 to rotate so that the surfaces of the body of the UAV are aligned with the third and fourth parts 108, 110. It should be noted however that rotation may not necessarily occur if the body of the UAV 200 is shaped differently to that depicted here. FIG. 9 therefore shows the UAV 200 in a slightly different position to that shown in FIG. 8 because the UAV 200 has contacted the second guide assembly and has begun its trajectory towards a second, lowering, position depicted in FIG. 10.

Figure 10:
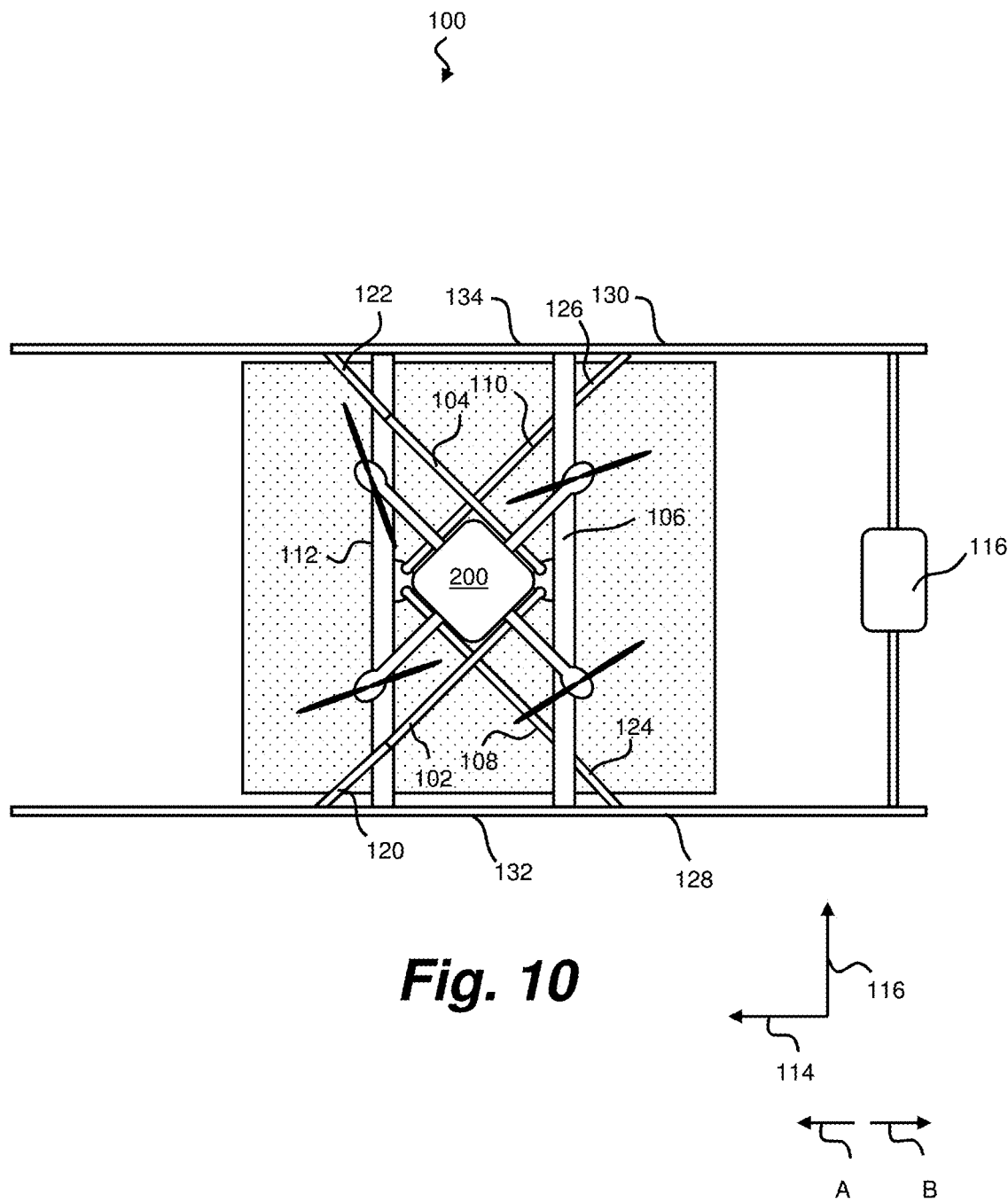

FIG. 10 depicts the positioning mechanism 100 at a fourth, later moment in time. As can be seen, the first and second guide assemblies have moved as far as they can. Further movement is restricted by the UAV 200 and/or the size constraints of the positioning mechanism 100, such as the guide rails. The UAV 200 may therefore be said to be located in a second position. Regardless of where on the surface 202 the UAV 200 was located initially, the second position will always be the same. The second position is therefore a known position because it is constant for each positioning event.

To move the UAV 200 into this second position, the drive system had continued to move the first and second guide assemblies towards each other so that the UAV is guided towards the second position. In this second position, the UAV 200 may abut both the first and second guide assemblies. In some examples, the first support 106 (and therefore the first guide assembly) stops moving in the first direction when either the first or second arms reach the end of the first and second guide rails 128, 130 respectively. Similarly, the second support 112 (and therefore the second guide assembly) stops moving in the second direction when the third or fourth arms reach the end of the third and fourth guide rails 132, 134 respectively. In some examples, the drive system actively causes the first and second guide assemblies to stop moving. For example, the drive system may be configured to stop once it has moved the guide assemblies by a certain distance, or it may stop the movement in response to a signal. For example, one or more sensors may detect that the UAV 200 has been moved into the second position and based on sensor data, the drive system may stop the movement.

Once in this second position, the UAV 200 is positioned upon the moveable platform 202*b*. The second position may therefore also be known as a lowering position because the moveable platform 202*b* may be configured to lower the platform 202*b* in a vertical direction below the rest of the landing surface 202. Before the platform is lowered, the drive system may move the first and second guide assemblies away from each other. FIG. 11 depicts the positioning mechanism 100 at a fifth, later moment in time. As can be seen, the first and second guide assemblies have moved in opposite directions, away from each other so as not to obstruct the UAV 200 from moving below the landing surface 202 while positioned on the moveable platform 202*b*.

FIGS. 12 and 13 relate to a third operational embodiment of the positioning mechanism of FIG. 1. In this third embodiment, only the first guide assembly moves and the surface 202 is different to that depicted in the first and second embodiments. The positioning mechanism in this example may be incorporated within a stowage area of a drone port/container, or be positioned on top of a drone port/container.

FIG. 12 depicts a positioning mechanism 100 arranged upon a surface 202, which may also be known as a landing surface. In this example, the surface 202 delimits an aperture 204 through which a payload may be collected or deposited. In some cases it is desirable to position a UAV 200 so that it is arranged above the aperture 204.

For brevity, the positioning mechanism 100 at a first moment in time is not depicted because it corresponds substantially that depicted in FIG. 2. In the initial, folded configuration, the first and second guide assemblies are arranged on opposite sides of the aperture 204. FIG. 12 therefore depicts the positioning mechanism 100 at a second, later moment in time. At this time, the UAV 200 has landed, or otherwise been placed upon the surface 202 in an area between the first and second guide assemblies. The UAV 200 may therefore be said to be initially located in a first position (also known as a landing position). At this time, the positioning mechanism 100 has started to execute a positioning procedure to relocate the UAV 200. The UAV may begin the procedure in the same or different way to that described in relation to the first embodiment.

As can be seen, the first and second guide assemblies have begun to unfold. To unfold, the drive system has caused the second ends 102*b*, 104*b* of the first and second parts 102, 104 to move towards the second guide assembly by causing the parts to rotate away from the first support 106. Similarly, the drive system has caused the second ends 108*b*, 110*b* of the third and fourth parts 108, 110 to move towards the first guide assembly by causing the parts to rotate away from the second support 112. These rotational movements may be effectuated by one or more actuators 118 (not shown in FIG. 8) or by any other means. These steps may be executed before, during or after movement of the first support 106. Movement of the first, second, third and fourth parts 102, 104, 108, 110 is substantially similar to that described in relation to FIG. 3.

From this position, the drive system is configured to move the first guide assembly towards the second guide assembly to move the UAV 200 towards the second guide assembly and therefore towards a second position located above the aperture 204. FIG. 13 depicts the positioning mechanism 100 at a third, later moment in time. At this time, the first and second guide assemblies have now fully unfolded in a way substantially similar to that described in relation to FIG. 4. In addition, the drive system has moved the first guide assembly in the first direction towards the second guide assembly by causing the first, moveable support 106 to move along the first axis 114 in the first direction. This movement caused the UAV 200 to be guided and moved from the initial, first position shown in FIG. 12, towards a second position. Intermediate steps showing the first guide assembly abutting the UAV 200 have been omitted for brevity.

As previously mentioned, the vertical offset of the guide rails 128, 130, 132, 134 allows the first guide assembly to pass above/below the second guide assembly. FIG. 13 shows the first part 102 crossing over the third part 108 and the second part 104 crossing over the fourth part 110. This allows the first and second guide assemblies to more closely come together.

In the position shown in FIG. 13, the second guide assembly has also abutted and therefore come into contact with the UAV 200. The angled nature of the first, second, third and fourth arms and the movement in the first direction funnels or guides the UAV 200 towards the second position.

FIG. 13 depicts the first guide assembly in its furthest achievable position along the first axis 114. Further movement is restricted by the UAV 200 and/or the size constraints of the positioning mechanism 100, such as the guide rails. In some examples, the first support 106 (and therefore the first guide assembly) stops moving in the first direction when either the first or second arms reach the end of the first and second guide rails 128, 130 respectively. In some examples, the drive system actively causes the first guide assembly to stop moving. For example, the drive system may be configured to stop once it has moved the guide assembly by a certain distance, or it may stop the movement in response to a signal. For example, one or more sensors may detect that the UAV 200 has been moved into the second position and based on sensor data, the drive system may stop the movement. Once in this second position, the UAV 200 is positioned above the aperture 204. After moving the UAV 200 into this second position, the drive system may cause the first guide assembly to move in the second direction, away from the UAV 200.

In any or all of the above embodiments, a UAV/drone delivery system may be used to store, process and deploy UAVs for package deliveries. In some embodiments, one or more UAVs are stored in or on a structure, such as on top of a container (e.g., a mobile trailer). One benefit of storing the UAVs at these structures is that it reduces the time necessary to task a UAV to process an order and receive a package for delivery. For instance, when the exemplary system receives a command to deliver a package, one of the UAVs placed on top of a container is processed to attach the package to the UAV. The processing of the UAVs may be automated to reduce processing time. For example, during the processing operation, a UAV's battery may be automatically swapped with a fully charged battery. The UAV is deployed for delivery when the exemplary system has processed the UAV. Thus, the UAV delivers goods instantaneously, for example, within a few minutes or hours from the time a consumer places an order.

Figure 14:
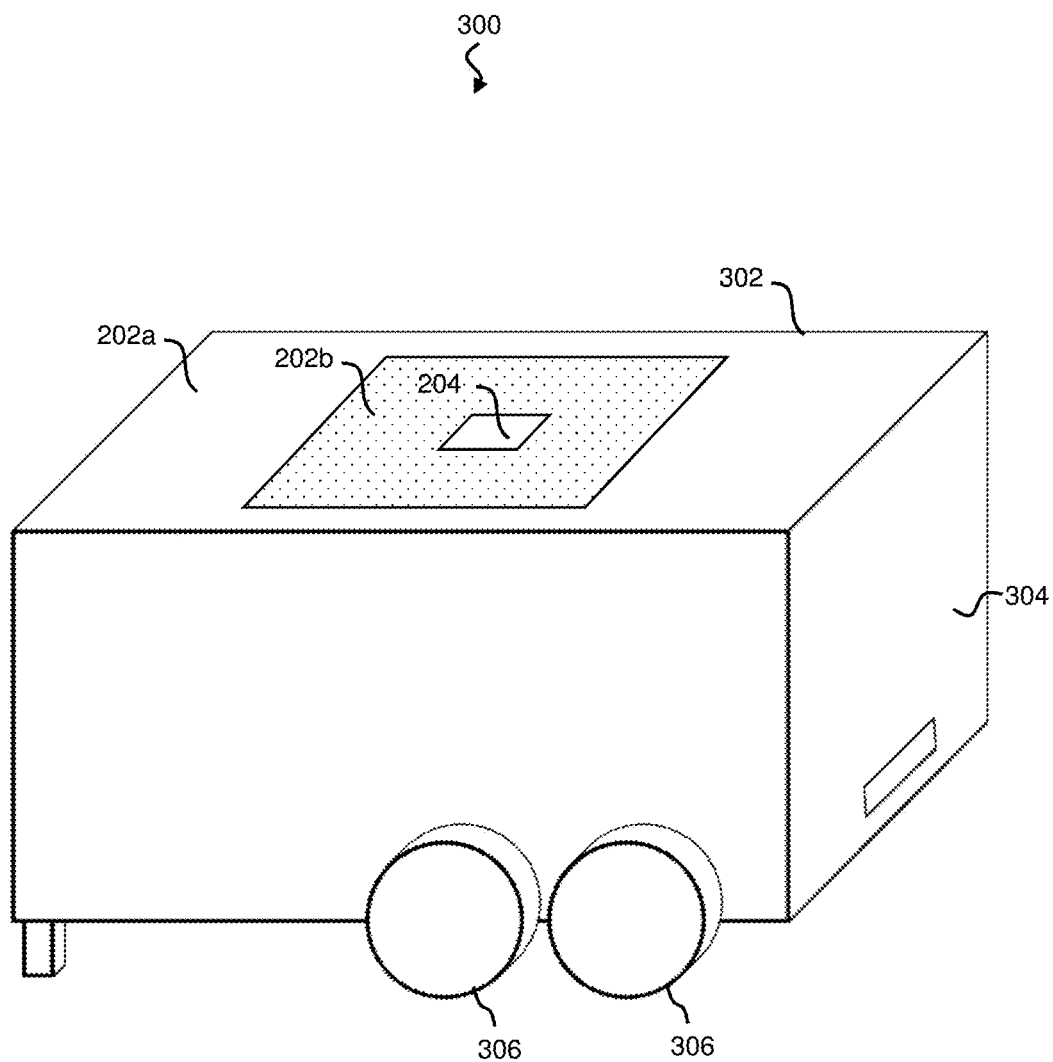
FIG. 14 is a perspective view of a UAV port in accordance with an example.

FIG. 14 depicts an example UAV delivery system 300. The exemplary system includes a container with a roof 302, a base, and multiple side surfaces 304 located between the roof and the base to enclose the container. Other example UAV delivery systems may comprise different shaped or sized containers. In some examples, the container may include wheels 306 to transport the container. In some examples, the UAV delivery system 300 can be located and transported to different locations. In some examples, the UAV delivery system 300 is communicably connected with one or more remote computing systems. For example, the UAV delivery system 300 may communicate with one or more remote servers and/or remote operators to transmit information about flight data, maintenance, security, package orders, etc.

In the example of FIG. 14, the roof forms, or has thereon a surface. The surface may be substantially similar to that described in any of FIGS. 2-13. For example, it may comprise a fixed surface part 202a, a moveable platform 202b and an aperture 204. Alternatively, the surface may be a fixed solid surface. In examples where the surface comprises a moveable platform 202b, the platforms may be moved within the container in a generally vertical direction. When the platform 202b is in an upper position (as shown in FIG. 14), the top of the platform 202b is level/flush with the top of the container roof 302. When the platform 202b is in a lowered position, the platform 202b may be programmed to stop at some height above the base of the container. The platform 202b may stop at some height above the base to allow the UAV located on the platform 202b to lower a cable including an attachment, such as a locking mechanism or a dongle, to attach to a package that is located below the platform 202b. The cable and/or package may pass through the aperture 204. The aperture 204 may therefore be sized to receive a package. The aperture may be closeable, and therefore initially be covered/closed by at least one member, such as a panel that can be opened. These members can protect the various components inside the container from dirt, debris, and weather. The platform may be lowered by any means.

Arranged upon or above the surface may be a positioning mechanism 100 like those described in relation to FIGS. 2-13. The UAV may therefore land on the surface and be positioned by the positioning mechanism 100.

Figure 15:
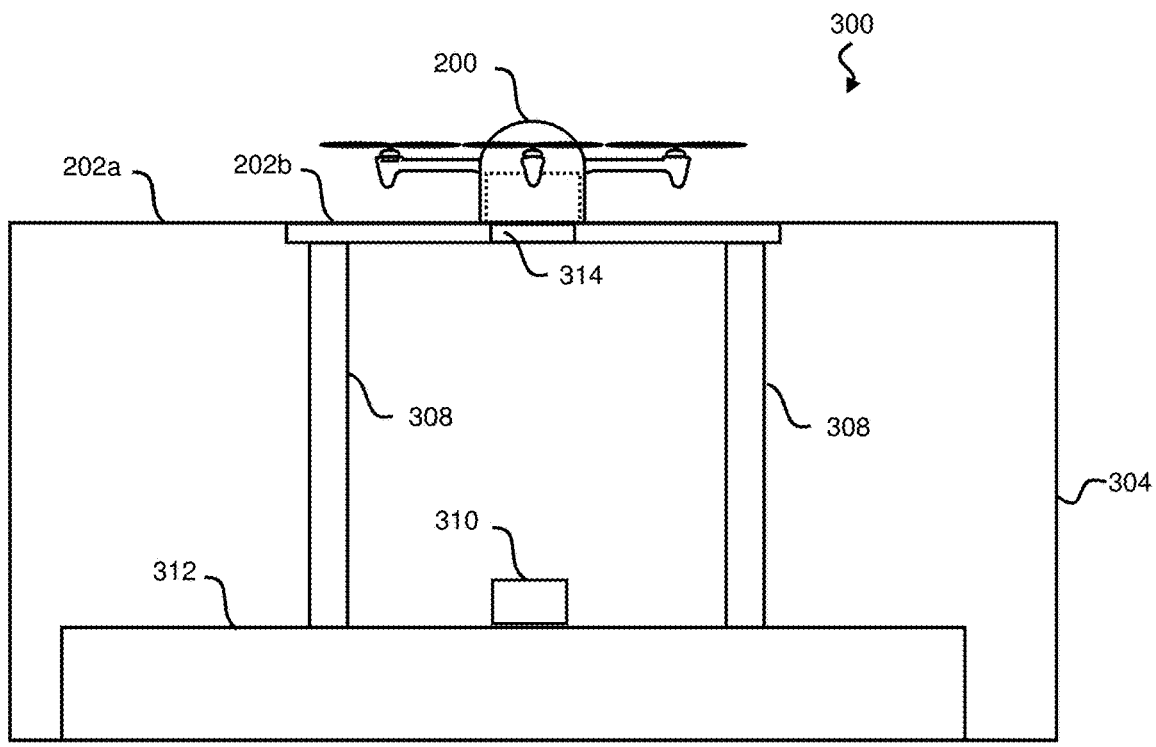
FIG. 15 is a side view of a UAV located on a moveable platform in accordance with an example.

FIG. 15 depicts a side view of the UAV delivery system 300 of FIG. 14. A UAV 200 has landed on the surface 202 and has been positioned by a positioning mechanism (not shown in FIG. 15) upon the moveable platform 202b. The platform 202b may be lowered into the container by moving one or more bars 308. The bars 308 may be telescopic, for example, and can retract in length to move the platform 202b into the container. The drive system may control the lowering and raising of the moveable platform 202b. For example, the controller may instruct or cause the bars 308 to operate once the UAV 200 has been positioned correctly upon the moveable platform 202b. A package 310, requiring delivery by the drone, is shown depicted upon a loading surface 312.

The aperture 204 is shown to be closed by one or more members 314. The one or more members are therefore in a closed configuration and form part of the landing surface 202 in FIG. 15. The drive system is arranged to move the one or more members into an open configuration so as to not obstruct the aperture.

Figure 16:
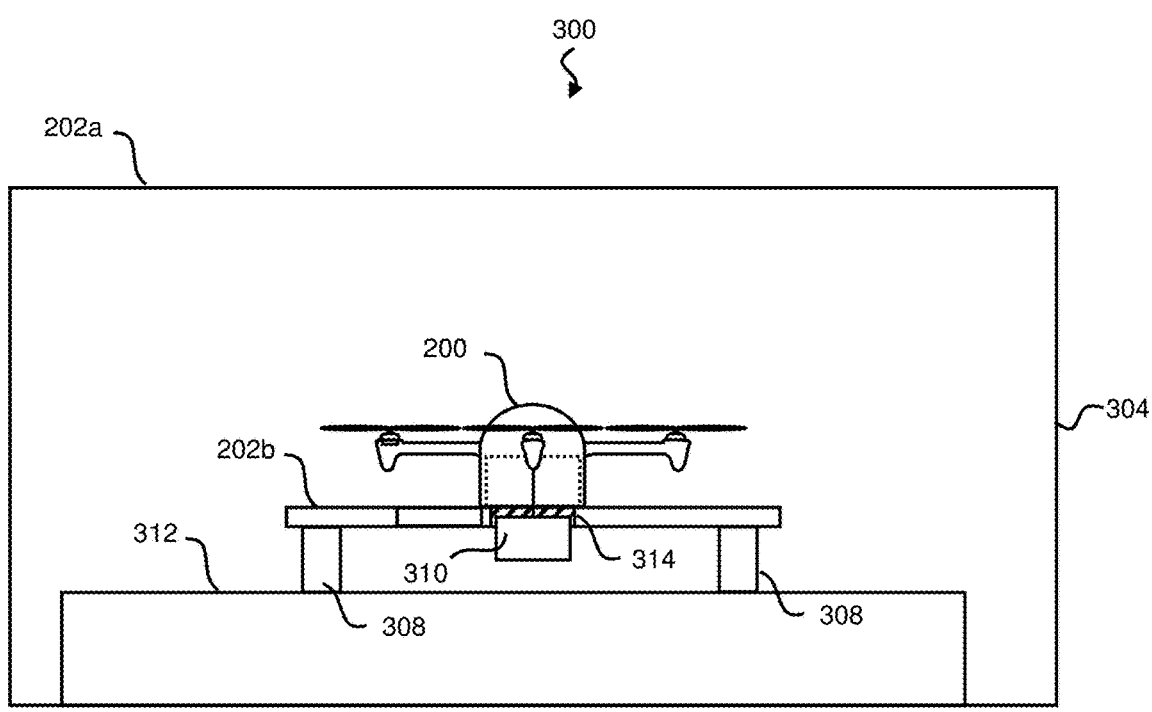
FIG. 16 is a side view of a UAV having been moved inside a container by lowering the moveable platform of FIG. 15.

FIG. 16 shows the moveable platform 202b in a lowered position. The bars 308 have retracted in length such that the platform 202b is located within the container. The one or more members 314 have also been moved into an open configuration by the drive system. For example, the one or more members 314 have been withdrawn into a compartment within the moveable platform 202b, so that the aperture is accessible. In another example, one or more members 314 may act like a trapdoor and therefore be hinged with respect to the moveable platform. A coupling mechanism, attached to one end of a tether, has been lowered from a compartment within the UAV 200 to engage the package 310. FIG. 16 therefore shows the package 310 as it is being lifted through the aperture before being received within the UAV compartment. Once received within the UAV compartment, the platform may be raised again to allow the UAV 200 to take flight and deliver the package 310 to a destination.

The above embodiments are to be understood as illustrative examples. Further embodiments are envisaged. For example, the lower recess and corresponding sensor device may be located at any point along the length of the padding, and so is not necessarily located within the mounting section portion. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A UAV positioning mechanism for moving a UAV from a first position to a third position via a second position, comprising:
   a first guide assembly comprising:
      a first part having a first retaining member connected thereto wherein the first retaining member is pivotably mounted on the first part; and
      a second part having a second retaining member connected thereto, wherein the second retaining member is pivotably mounted on the second part;
   a second guide assembly spaced apart from the first guide assembly, wherein the first and second guide assemblies define therebetween an area for receiving a UAV; and
   a drive system for moving the first guide assembly in a first direction and a second direction;
   wherein the drive system is arranged to:
      move the first guide assembly in the first direction towards the second guide assembly, such that the first part and the second part guide the UAV from a first position to a second position;
      pivot the first and second retaining members between a first configuration and a second configuration, wherein:
         in the first configuration, the first and second retaining members are arranged substantially parallel to the first and second parts, respectively; and
         in the second configuration, the first and second retaining members define an angle between the first and second parts, respectively; and
      move the first guide assembly in the second direction to move the UAV from the second position to a third position;
   wherein the first and second retaining members are arranged to:
      engage the UAV when the UAV is positioned at the second position such that the UAV moves with the first guide assembly in the second direction to the third position.

2. The UAV positioning mechanism of claim 1, wherein:
   the first guide assembly comprises a movable support;
   the first part has a first end and a second end, and the first end of the first part is mounted on the movable support;
   the second part has a first end and a second end, and the first end of the second part is mounted on the movable support; and
   the drive system is arranged to:
      move the second ends of the first and second parts towards the second guide assembly; and
      move the moveable support towards the second guide assembly.

3. The UAV positioning mechanism of claim 2, wherein the first ends of the first and second parts are pivotably mounted on the moveable support, and the drive system comprises:
   a first actuator arranged to pivot the second end of the first part towards the second guide assembly; and
   a second actuator arranged to pivot the second end of the second part towards the second guide assembly.

4. The UAV positioning mechanism of claim 2, wherein the first guide assembly further comprises first and second portions connected to the first and second parts respectively via one or more hinges, wherein the first and second portions are arranged to hinge as the second ends of the first and second parts move towards the second guide assembly.

5. The UAV positioning mechanism of claim 4, wherein the first guide assembly further comprises:
   a first guide rail; and
   a second guide rail arranged substantially parallel to, and spaced apart from, the first guide rail;
   wherein:
      an end of the first portion is slidably mounted on the first guide rail, such that the first portion moves along the first guide rail as the drive system moves the first guide assembly in the first and second directions; and
      an end of the second portion is slidably mounted on the second guide rail, such that the second portion moves along the second guide rail as the drive system moves the first guide assembly in the first and second directions.

6. The UAV positioning mechanism of claim 1, wherein the second guide assembly comprises:
   a support;
   a first part of the second guide assembly; and
   a second part of the second guide assembly;
   wherein:
      the first part of the second guide assembly has a first end and a second end, and the first end of the first part of the second guide assembly is mounted on the support;
      the second part of the second guide assembly has a first end and a second end, and the first end of the second part of the second guide assembly is mounted on the support;
      the first and second parts of the second guide assembly are arranged to guide the UAV towards the second position; and
   the drive system is arranged to move the second ends of the first and second parts of the second guide assembly towards the first guide assembly.

7. The UAV positioning mechanism of claim 6, wherein the first ends of the first and second parts of the second guide assembly are pivotably mounted on the support, and the drive system comprises:
   a third actuator arranged to pivot the second end of the first part of the second guide assembly towards the first guide assembly; and a fourth actuator arranged to pivot the second end of the second part of the second guide assembly towards the first guide assembly.

8. The UAV positioning mechanism of claim 6, wherein:
the second guide assembly is spaced apart from the first guide assembly along a first axis and the area extends along at least the first axis and a second axis, the second axis being perpendicular to the first axis;
the first guide assembly is spaced apart from the second guide assembly along a third axis, the third axis being perpendicular to both the first axis and the second axis; and when the drive system moves the first guide assembly in the first direction towards the second guide assembly, the first part of the first guide assembly is spaced apart from the first part of the second guide assembly along the third axis and the second part of the first guide assembly is spaced apart from the second part of the second guide assembly along the third axis when the UAV is located at the second position.

9. The UAV positioning mechanism of claim 6, wherein the second guide assembly further comprises first and second portions connected to the first and second parts of the second guide assembly respectively via one or more hinges, wherein the first and second portions of the second guide assembly are arranged to hinge as the second ends of the first and second parts of the second guide assembly move towards the first guide assembly.

10. The UAV positioning mechanism of claim 1, further comprising a moveable platform capable of forming at least part of a surface for receiving the UAV, wherein the first and second positions are positions on the surface, and the third position is a position on the platform; and
the drive system is arranged to lower the platform along an axis arranged perpendicular to a plane defined by the platform, thereby to lower the UAV with respect to the surface.

11. The UAV positioning mechanism of claim 10, wherein the platform delimits an aperture through which to receive or deposit a payload.

12. The UAV positioning mechanism of claim 11, wherein the aperture is closable.

13. The UAV positioning mechanism of claim 10, wherein the drive system is arranged to:
move the first and second guide assemblies away from each other before lowering the platform.

\* \* \* \* \*